(12) United States Patent
Lee et al.

(10) Patent No.: US 11,726,701 B2
(45) Date of Patent: Aug. 15, 2023

(54) MEMORY EXPANDER, HETEROGENEOUS COMPUTING DEVICE USING MEMORY EXPANDER, AND OPERATION METHOD OF HETEROGENOUS COMPUTING

(71) Applicant: SAMSUNG ELECTRONICS CO., LTD., Suwon-si (KR)

(72) Inventors: Chon Yong Lee, Hwaseong-si (KR); Jae-Gon Lee, Seoul (KR); Kyunghan Lee, Suwon-si (KR)

(73) Assignee: SAMSUNG ELECTRONICS CO., LTD.

( * ) Notice: Subject to any disclaimer, the term of this patent is extended or adjusted under 35 U.S.C. 154(b) by 34 days.

(21) Appl. No.: 17/509,669

(22) Filed: Oct. 25, 2021

(65) Prior Publication Data
US 2022/0137865 A1    May 5, 2022

(30) Foreign Application Priority Data
Oct. 29, 2020   (KR) ........................ 10-2020-0141710

(51) Int. Cl.
G06F 3/06        (2006.01)
G06F 13/16       (2006.01)
G06F 9/28        (2006.01)
G06F 9/451       (2018.01)
G06F 12/02       (2006.01)
G06F 13/38       (2006.01)

(52) U.S. Cl.
CPC .......... G06F 3/0655 (2013.01); G06F 3/0604 (2013.01); G06F 3/0679 (2013.01)

(58) Field of Classification Search
CPC .............................. G06F 3/0655; G06F 3/0604
USPC ......................................................... 711/154
See application file for complete search history.

(56) References Cited

U.S. PATENT DOCUMENTS

| | | | |
|---|---|---|---|
| 7,084,248 B2 | 8/2006 | Summerton | |
| 7,984,248 B2 | 7/2011 | Kottapalli et al. | |
| 10,467,176 B2 | 11/2019 | Morishita et al. | |
| 2005/0278502 A1* | 12/2005 | Hundley | G06F 9/4843 712/34 |
| 2009/0307416 A1 | 12/2009 | Luo et al. | |

(Continued)

FOREIGN PATENT DOCUMENTS

| | | |
|---|---|---|
| KR | 19960002031 A | 5/1997 |
| KR | 101227885 B1 | 1/2013 |

OTHER PUBLICATIONS

IEEE search results (Year: 2023).*

(Continued)

*Primary Examiner* — Edward J Dudek, Jr.
*Assistant Examiner* — Sidney Li
(74) *Attorney, Agent, or Firm* — Fish & Richardson P.C.

(57) ABSTRACT

A memory expander includes a memory device that stores a plurality of task data. A controller controls the memory device. The controller receives metadata and a management request from an external central processing unit (CPU) through a compute express link (CXL) interface and operates in a management mode in response to the management request. In the management mode, the controller receives a read request and a first address from an accelerator through the CXL interface and transmits one of the plurality of task data to the accelerator based on the metadata in response to the read request.

20 Claims, 24 Drawing Sheets

(56) References Cited

U.S. PATENT DOCUMENTS

| | | |
|---|---|---|
| 2018/0011812 A1* | 1/2018 | Morishita ............... G06F 3/067 |
| 2018/0150298 A1* | 5/2018 | Balle ....................... G06F 21/57 |
| 2019/0179670 A1 | 6/2019 | Kim et al. |
| 2020/0042240 A1 | 2/2020 | Therene et al. |
| 2020/0050570 A1* | 2/2020 | Agarwal ............. G06F 13/4022 |
| 2020/0065290 A1 | 2/2020 | Natu |
| 2020/0159584 A1 | 5/2020 | Cho et al. |
| 2020/0327084 A1 | 10/2020 | Choudhary et al. |
| 2022/0114125 A1* | 4/2022 | Thakur ............... G06F 13/4068 |

OTHER PUBLICATIONS

Google Scholar search results (Year: 2023).*
Prateek Shantharama et al., "Hardware-Accelerated Platforms and Infrastructures for Network Functions: A Survey of Enabling Technologies and Research Studies", IEEE Access, vol. 8, 2020, pp. 132021-132085.

* cited by examiner

FIG. 5B

| Valid | MEM opcode | MetaField | MetaValue | SNP Type | Address | Tag | TC | Poison | RSVD | Position |
|---|---|---|---|---|---|---|---|---|---|---|

CXL_header1

FIG. 11B

| Valid | MEM opcode | MetaField | MetaValue | Tag | TC | Poison | RSVD | Position |

CXL_header2

FIG. 18B

| Valid | MEM opcode | MetaField | MetaValue | SNP Type | Address | Tag | TC | RSVD |
|---|---|---|---|---|---|---|---|---|

CXL_header3

MEMORY EXPANDER, HETEROGENEOUS COMPUTING DEVICE USING MEMORY EXPANDER, AND OPERATION METHOD OF HETEROGENOUS COMPUTING

CROSS-REFERENCE TO RELATED APPLICATIONS

This application claims priority under 35 U.S.C. § 119 to Korean Patent Application No. 10-2020-0141710 filed on Oct. 29, 2020, in the Korean Intellectual Property Office, the disclosure of which is incorporated by reference herein in its entirety.

BACKGROUND

Embodiments of the present disclosure described herein relate to a computing system, and more particularly, relate to a memory expander, a heterogeneous computing device using the memory expander, and an operation method of the heterogeneous computing device.

A computing system may provide various information technology (IT) services to a user. As various IT services are provided to the user, the amount of data that are processed by the computing system increases. For this reason, there is a need to improve a speed at which data are processed. The computing system is developing into a heterogeneous computing environment to provide various IT services. Nowadays, various technologies for processing data at a high speed within the heterogeneous computing environment are being developed.

SUMMARY

Embodiments of the present disclosure provide a memory expander with improved performance, a heterogeneous computing device using the memory expander, and an operation method of the heterogeneous computing device.

According to an embodiment, a memory expander includes a memory device that stores a plurality of task data and a controller that controls the memory device. The controller receives metadata and a management request from an external central processing unit (CPU) through a compute express link (CXL) interface and operates in a management mode in response to the management request. In the management mode, the controller receives a read request and a first address from an accelerator through the CXL interface and transmits one of the plurality of task data to the accelerator based on the metadata in response to the read request.

According to an embodiment, a heterogeneous computing device includes a central processing unit (CPU), a memory that stores data under control of the CPU, an accelerator that repeatedly performs computation on a plurality of task data and generates a plurality of result data, and a memory expander that operates in a management mode in response to a management request from the CPU and manages the plurality of task data to be provided to the accelerator and the plurality of result data provided from the accelerator, in the management mode. The CPU, the accelerator, and the memory expander communicate with each other through a heterogeneous computing interface.

According to an embodiment, an operation method of a heterogeneous computing device, which includes a central processing unit (CPU) an accelerator, and a memory expander connected through a compute express link (CXL) interface, includes transmitting by the CPU metadata to the memory expander, transmitting by the CPU a management request to the memory expander, transmitting by the CPU a task request to the accelerator, transmitting by the accelerator a read request to the memory expander in response to the task request, transmitting by the memory expander first task data of a plurality of task data to the accelerator based on the metadata in response to the read request, performing by the accelerator first computation on the first task data to generate first result data, transmitting by the accelerator a write request and the first result data to the memory expander, and storing by the memory expander the first result data in response to the write request.

BRIEF DESCRIPTION OF THE FIGURES

The above and other objects and features of the present disclosure will become apparent by describing in detail embodiments thereof with reference to the accompanying drawings.

FIG. 5B is a diagram illustrating header information of a management request in operation S103 of FIG. 5A.

FIG. 11B is a diagram illustrating header information of a completion of FIG. 11A.

FIG. 18B is a diagram illustrating header information included in a status request in operation S1010 of FIG. 18A.

DETAILED DESCRIPTION

Below, embodiments of the present disclosure may be described in detail and clearly to such an extent that one skilled in the art easily implements the present disclosure.

Figure 1:
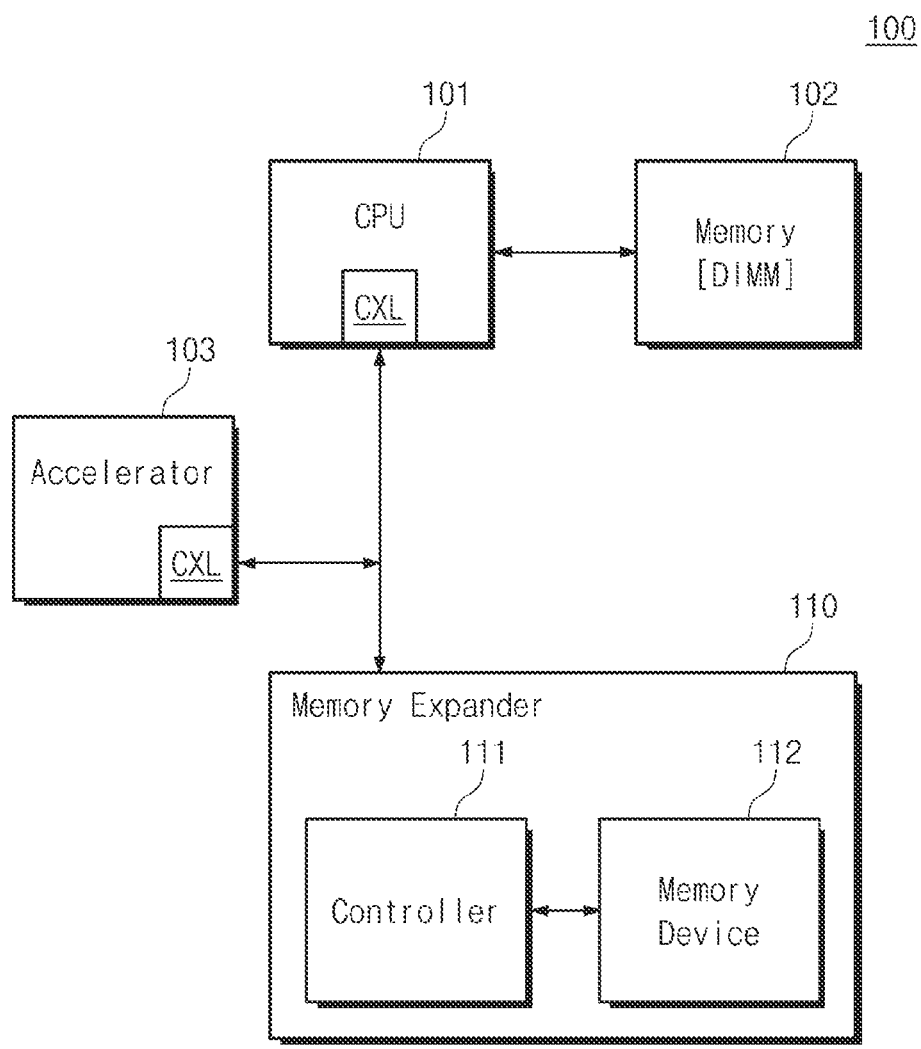
FIG. 1 is a diagram illustrating a computing device according to an embodiment of the present disclosure.

FIG. 1 is a diagram illustrating a computing device according to an embodiment of the present disclosure. Referring to FIG. 1, a computing device 100 may include a central processing unit (CPU) 101, a memory 102, an accelerator 103, and a memory expander 110. In an embodiment, the computing device 100 may include a heterogeneous computing device or a heterogeneous computing system. A heterogeneous computing system may be a system that includes different types of computing devices organically connected with each other and is configured to perform various functions. For example, as illustrated in FIG. 1, the computing device 100 may include the CPU 101 and the accelerator 103. The CPU 101 and the accelerator 103 may be different types of computing devices. Below, for convenience of description, the simple expression "computing device" is used, but the present disclosure is not limited thereto. For example, a computing device may indicate a heterogeneous computing device.

The CPU 101 may be a processor core configured to control overall operations of the computing device 100. For example, the CPU 101 may be configured to decode instructions of an operating system or various programs driven on the computing device 100 and to process data based on a result of the decoding. The CPU 101 may communicate with the memory 102. Data processed by the CPU 101 or data necessary during an operation of the CPU 101 may be stored in the memory 102. In an embodiment, the memory 102 may be a memory based on a dual in-line memory module (DIMM) and may directly communicate with the CPU 101. The memory 102 may be used as a buffer memory, a cache memory, or a system memory of the CPU 101.

The accelerator 103 may include a processor core or a computer (or a calculator) configured to perform a specific calculation. For example, the accelerator 103 may be a computer or a processor, which is configured to perform an artificial intelligence (AI) operation, such as a graphics processing unit (GPU) or a neural processing unit (NPU). In an embodiment, the accelerator 103 may perform a computation operation under control of the CPU 101.

The memory expander 110 may operate under control of the CPU 101. For example, the memory expander 110 may communicate with the CPU 101 through a heterogeneous computing interface. In an embodiment, the heterogeneous computing interface may include an interface that is based on a compute express link (CXL) protocol. Below, for convenience of description, it is assumed that the heterogeneous computing interface is a CXL protocol-based interface, that is, a CXL interface, but the present disclosure is not limited thereto. For example, the heterogeneous computing interface may be implemented based on at least one of various computing interfaces such as a Gen-Z protocol, an NVLink protocol, a CCIX (Cache Coherent Interconnect for Accelerators) protocol, and an Open CAPI (Coherent Accelerator Processor Interface) protocol.

The memory expander 110 may be controlled by the CPU 101 through the CXL interface so as to store data or to output the stored data. That is, the CPU 101 may use the memory expander 110 as a memory region having a function similar to that of the memory 102. In an embodiment, the memory expander 110 may correspond to a Type 3 memory device defined by the CXL standard.

The memory expander 110 may include a controller 111 and a memory device 112. The controller 111 may store data in the memory device 112 or may read data stored in the memory device 112.

In an embodiment, the accelerator 103 may be connected with the CXL interface. The accelerator 103 may receive a task command from the CPU 101 through the CXL interface and may receive data from the memory expander 110 through the CXL interface in response to the received task command. The accelerator 103 may perform a computation operation on the received data and may store a result of the computation operation in the memory expander 110 through the CXL interface.

In an embodiment, data to be processed by the accelerator 103 may be managed by the CPU 101. In this case, whenever computation is processed by the accelerator 103, data allocation by the CPU 101 may be required, thereby causing the reduction of performance. The memory expander 110 according to an embodiment of the present disclosure may be configured to manage data allocated or to be allocated to the accelerator 103 based on metadata from the CPU 101. Below, an operation of the memory accelerator 102 according to an embodiment of the present disclosure will be more fully described with reference to the following drawings.

Figure 2:
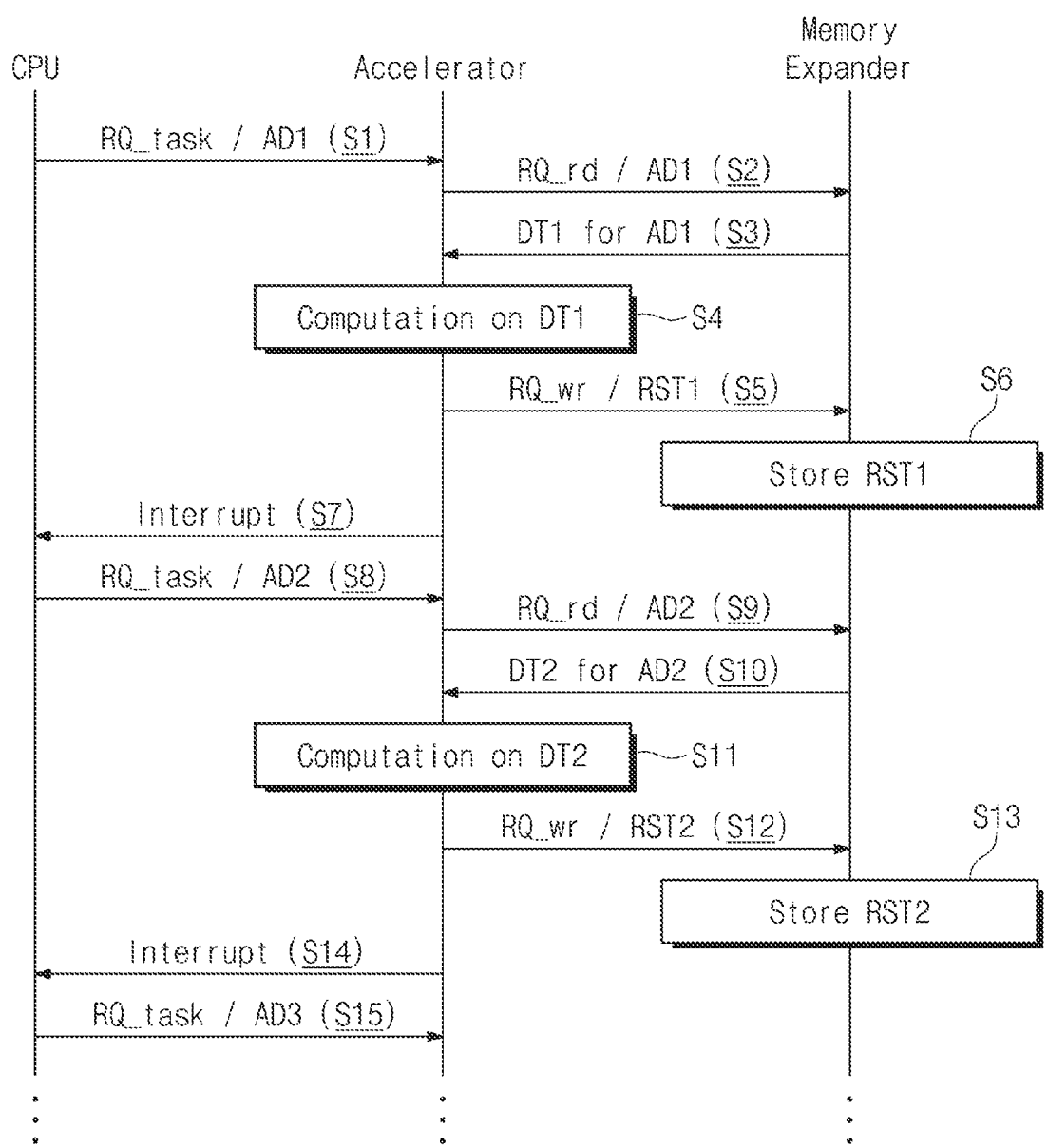
FIG. 2 is a flowchart illustrating an operation of a computing device of FIG. 1.

FIG. 2 is a flowchart illustrating an operation of a computing device of FIG. 1. An operation in which the CPU 101 directly manages data to be processed by the accelerator 103 will be described with reference to FIG. 2. Below, unless otherwise defined, it is assumed that the communication between components is performed based on a CXL protocol-based communication packet. That is, the CPU 101, the accelerator 103, and the memory expander 110 may communicate with each other through the CXL interfaces, and a request or data that are exchanged between the CPU 101, the accelerator 103, and the memory expander 110 may have a structure of a CXL protocol-based communication packet. However, the present disclosure is not limited thereto. For example, the CPU 101, the accelerator 103, and the memory expander 110 may communicate with each other based on at least one of various computing interfaces such as a Gen-Z protocol, an NVLink protocol, a CCIX protocol, and an Open CAPI protocol.

Below, for convenience of description, it is assumed that data to be processed by the accelerator 103 are stored in the memory expander 110. That is, the CPU 101 may store data to be processed by the accelerator 103 in the memory expander 110. However, the present disclosure is not limited thereto.

Referring to FIGS. 1 and 2, in operation S1, the CPU 101 may transmit a task request RQ_task and a first address AD1 to the accelerator 103. The task request RQ_task may be a task start command for data corresponding to the first address AD1. The first address AD1 may be a memory address that is managed by the CPU 101, and data corresponding to the first address AD1 may be stored in the memory device 112 of the memory expander 110.

In operation S2, the accelerator 103 may transmit a read request RQ_rd and the first address AD1 to the memory expander 110 in response to the task request RQ_task. In operation S3, the memory expander 110 may transmit first data DT1 corresponding to the first address AD1 to the accelerator 103. In operation S4, the accelerator 103 may perform computation on the first data DT1. In operation S5, the accelerator 103 may transmit a computation result of the first data DT1, that is, first result data RST1 and a write request RQ_wr to the memory expander 110. In operation S6, the memory expander 110 may store the first result data RST1 in the memory device 112. In operation S7, the accelerator 103 may generate an interrupt to the CPU 101. In an embodiment, the interrupt may be information providing notification that the first data DT1 corresponding to the first address AD1 are completely computed and that the first result data RST1 are stored in the memory expander 110.

In operation S8, the CPU 101 may transmit the task request RQ_task and a second address AD2 to the accelerator 103 in response to the interrupt. In operation S9, the accelerator 103 may transmit the read request RQ_rd and the second address AD2 to the memory expander 110 in response to the task request RQ_task. In operation S10, the memory expander 110 may transmit second data DT2 corresponding to the second address AD2 to the accelerator 103. In operation S11, the accelerator 103 may perform computation on the second data DT2. In operation S12, the accelerator 103 may transmit a computation result of the second data DT2, that is, second result data RST2 and the write request RQ_wr to the memory expander 110. In operation S13, the memory expander 110 may store the second result data RST2 in the memory device 112. In operation S14, the accelerator 103 may generate an interrupt to the CPU 101. In operation S15, the CPU 101 may transmit the task request RQ_task and a third address AD3 to the accelerator 103 in response to the interrupt. The CPU 101, the accelerator 103, and the memory expander 110 may repeatedly perform the above process until all data included in a task are completely computed.

As described above, in the case where data to be processed by the accelerator 103 are managed by the CPU 101, whenever one computation is completed by the accelerator 103, an interrupt to the CPU 101 may be generated, and the CPU 101 repeatedly transmits an address to the accelerator 103. The above repetition operation and the interrupt may make the utilization of the CPU 101 low.

Figure 3:
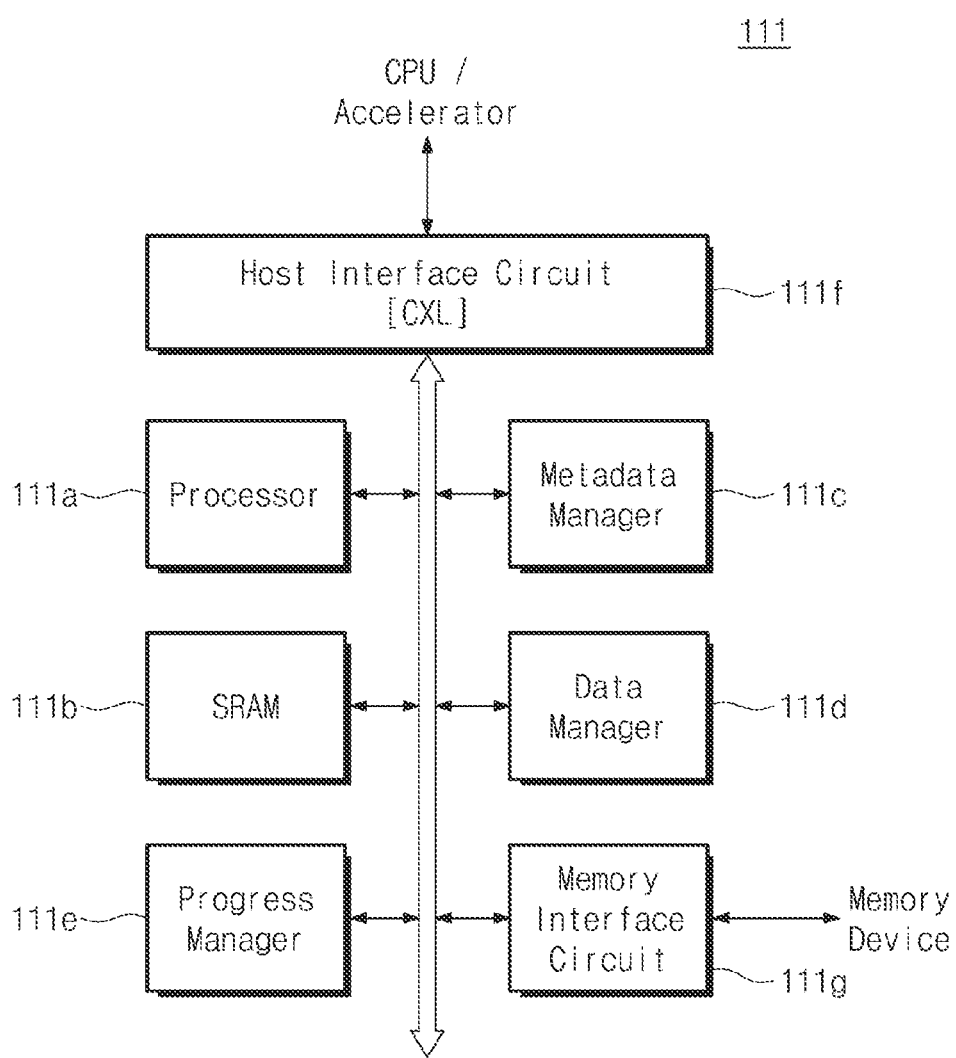
FIG. 3 is a block diagram illustrating a configuration of a memory expander of FIG. 1.
Figure 4:
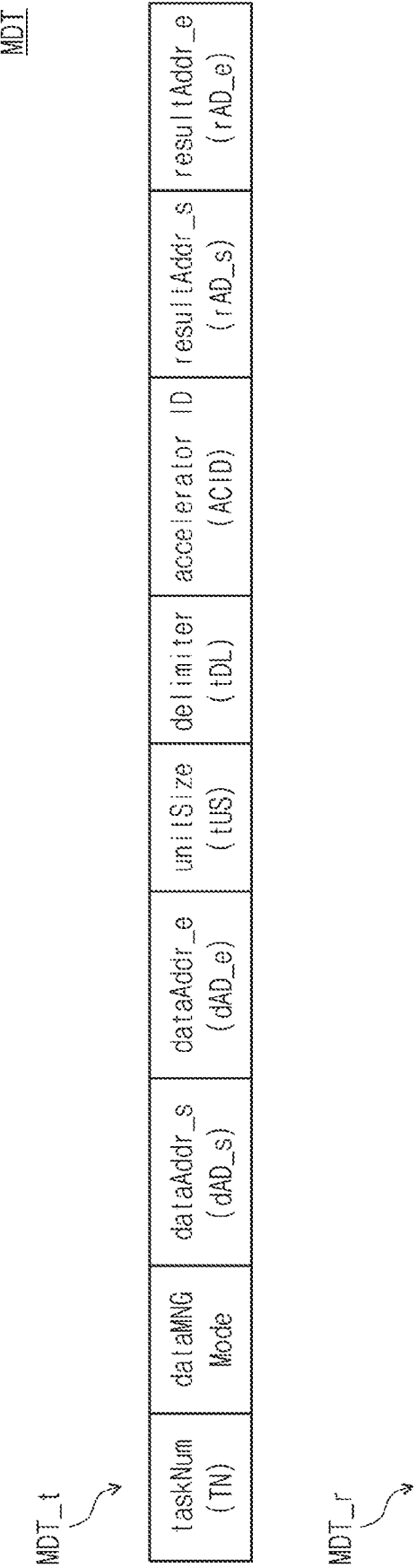
FIG. 4 is a diagram illustrating metadata managed by a metadata manager of a controller of FIG. 3.

FIG. 3 is a block diagram illustrating a configuration of a memory expander of FIG. 1. FIG. 4 is a diagram illustrating metadata managed by a metadata manager of a controller of FIG. 3. Referring to FIGS. 1, 3, and 4, the controller 111 may include a processor 111a, an SRAM 111b, a metadata manager 111c, a data manager 111d, a process manager 111e, a host interface circuit 111f, and a memory interface circuit 111g.

The processor 111a may be configured to control overall operations of the controller 111 or the memory expander 110. The SRAM 111b may operate as a buffer memory or a system memory of the controller 111. In an embodiment, components to be described below, such as the metadata manager 111c, the data manager 111d, and the process manager 111e, may be implemented by software, hardware, or a combination thereof. The components implemented by software may be stored in the SRAM 111b and may be driven by the processor 111a.

The metadata manager 111c may be configured to manage metadata MDT stored in the memory expander 110. For example, the metadata MDT may be information provided from the CPU 101. The metadata MDT may include information necessary for the memory expander 110 to allocate data to the accelerator 103, to store result data, or to manage reference data.

As illustrated in FIG. 4, the metadata MDT may include task metadata MDT_t and reference metadata MDT_r. The task metadata MDT_t may include at least one of a task number TN, a data management mode dataMNGMode, a data start address dAD_s, a data end address dAD_e, a unit size of task data tUS, a delimiter of task data tDL, an accelerator identifier ACID, a result data start address rAD_s, and a result data end address rAD_e.

The task number TN may be a number or an identifier for distinguishing tasks allocated by the CPU 101. The data management mode dataMNGMode may indicate a manner of managing data or result data associated with a relevant task. In an embodiment, the data management manner may include various management manners such as Heap, Queue, and key-value.

The data start address dAD_s may indicate a start address of a memory region where a data set to be processed in a relevant task is stored, and the data end address dAD_e may indicate an end address of the memory region where the data set to be processed in the relevant task is stored.

The unit size of task data tUS may indicate a unit for dividing a data set between the data start address dAD_s and the data end address dAD_e. For example, in the case where a data set between the data start address dAD_s and the data end address dAD_e is 16 Kbytes and the unit size of task data tUS is set to 2 Kbytes, the data set may be divided into 8 (=16/2) unit data, and the accelerator 103 may receive one unit data and may perform computation on the received unit data.

The delimiter of task data tDL may indicate a character or a mark for dividing a data set between the data start address dAD_s and the data end address dAD_e. For example, in the case where the delimiter of task data tDL is set to ",", a data set between the data start address dAD_s and the data end address dAD_e may be divided into unit data, based on the delimiter of ",". In an embodiment, sizes of unit data divided by the delimiter of task data tDL may be different.

The accelerator identifier ACID may be information for specifying an accelerator that will process a relevant task. In an embodiment, as described with reference to the following drawings, a computing device may include a plurality of accelerators. In this case, individual tasks may be respectively allocated to the plurality of accelerators, and a CPU may set the accelerator identifier ACID of metadata based on a task allocated to each accelerator.

The result data start address rAD_s may indicate a start address of a memory region where result data computed by the accelerator 103 are stored. The result data end address rAD_e may indicate an end address of the memory region where the result data computed by the accelerator 103 are stored.

In an embodiment, specific computation that is performed by the accelerator 103 may need to refer to different data or reference data included in the memory expander 110, as well as task data. In this case, reference data may be selected based on the reference metadata MDT_r.

For example, the reference metadata MDT_r may include at least one of a reference number (refNum) RN, an operation code, a reference start address rAD_s, a reference end address rAD_e, a unit size of reference data rUS, a delimiter of reference data rDL, a tag, a lifetime, and reserved information.

The reference number RN may be information for identifying data to be referenced.

The operation code may indicate information defining a computation operation or internal computation using reference data.

The reference start address rAD_s may indicate a start address of a memory region where reference data are stored, and the reference end address rAD_e may indicate an end address of the memory region where the reference data are stored.

The unit size of reference data rUS may indicate a data size for dividing reference data, and the delimiter of reference data rDL may be a character or a mark used to divide reference data. The unit size of reference data rUS and the delimiter of reference data rDL are similar in function and operation to the unit size of task data tUS and the delimiter of task data tDL except that target data are different, and thus additional description will be omitted to avoid redundancy.

The tag may include tag information associated with a computation operation or internal computation using reference data. The lifetime may include information about a time (e.g., an end time of a computation operation) during which a computation operation is performed. The reserved information may include any other information associated with the metadata MDT.

Reference data may be selected based on the reference metadata MDT_r described above, and various computation operations such as an arithmetic operation, a merge operation, and a vector operation may be performed on the selected reference data and task data. In an embodiment, information of the reference metadata MDT_r may correspond to partial information of the task metadata MDT_t.

Below, for better understanding, it is assumed that the metadata MDT are the task metadata MDT_t. That is, in embodiments to be described below, it is assumed that the accelerator 103 performs a computation on task data. However, the present disclosure is not limited thereto. For example, reference data may be selected by using the reference metadata MDT_r and various computations may be performed on the selected reference data and task data.

The metadata manager 111c may manage the metadata MDT described above.

The data manager 111d may be configured to manage data stored in the memory device 112. For example, the data manager 111d may identify task data stored in the memory device 112 by using the unit size or the delimiter and may sequentially output the identified unit data. Alternatively, the data manager 111d may be configured to sequentially store result data from the accelerator 103 in the memory device 112. In an embodiment, the data manager 111d may include a read counter configured to manage an output of task data and a write counter configured to manage an input of result data.

The process manager 111e may provide the CPU 101 with information about a task progress situation in response to a progress check request from the CPU 101. For example, the process manager 111e may check a situation of task data being computed and computation-completed task data based on values of the read counter and the write counter managed by the data manager 111d and may provide the checked information to the CPU 101.

The controller 111 may communicate with the CPU 101 and the accelerator 103 through the host interface circuit 111f. The host interface circuit 111f may be a CXL protocol-based interface circuit. The host interface circuit 111f may be configured to support at least one of various heterogeneous computing interfaces, such as a Gen-Z protocol, an NVLink protocol, a CCIX protocol, and an Open CAPI protocol, as well as a heterogeneous computing interface such as the CXL protocol.

The controller 111 may be configured to control the memory device 112 through the memory interface circuit 111g. The memory interface circuit 111g may be configured to support various interfaces depending on kinds of the memory device 112. In an embodiment, the memory interface circuit 111g may be configured to support a memory interface such as a toggle interface or a double data rate (DDR) interface.

Figure 5A:
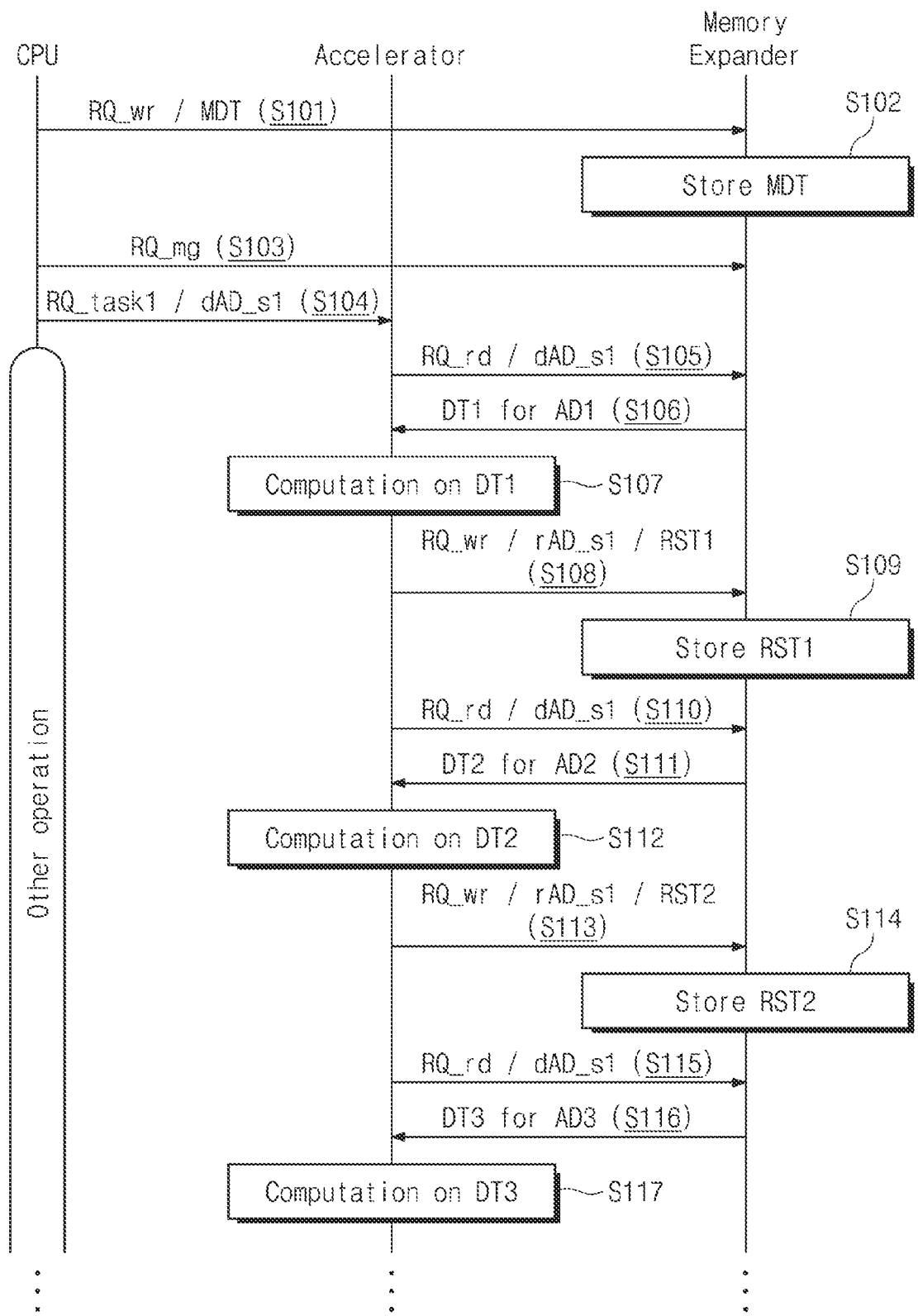
FIG. 5A is a flowchart illustrating an operation of a computing device of FIG. 1.

FIG. 5A is a flowchart illustrating an operation of a computing device of FIG. 1. FIG. 5B is a diagram illustrating header information of a management request in operation S103 of FIG. 5A. An embodiment to be described below will be provided to describe technical features of the present disclosure easily, and the present disclosure is not limited thereto. For example, in flowcharts to be described below, specific operations are illustrated as independent operations, but the present disclosure is not limited thereto. For example, some operations may be integrated by one request.

Below, for convenience of description, it is assumed that task data for computation of the accelerator 103 are in advance stored in the memory expander 110 by the CPU 101.

Below, unless otherwise defined, it is assumed that the communication between components is performed based on the CXL protocol. That is, the communication between components may be performed based on a CXL protocol-based communication packet. However, the present disclosure is not limited thereto. For example, components may communicate with each other based on one of the interfaces described above.

Referring to FIGS. 1, 5A, and 5B, in operation S101, the CPU 101 may transmit the write request RQ_wr and the metadata MDT to the memory expander 110.

In operation S102, the memory expander 110 may store the metadata MDT. For example, the metadata manager 111c of the controller 111 may store and manage the metadata MDT in the memory device 112 or the SRAM 111b.

In an embodiment, operation S101 and operation S102 may be performed in an initialization operation of the computing device 100. That is, the metadata MDT that are necessary for the memory expander 110 to perform a management operation for task data may be loaded during the initialization operation. Alternatively, the memory expander 110 may store the metadata MDT in the form of separate firmware. In this case, instead of operation S101 and operation S102, the CPU 101 may provide the memory expander 110 with a request for loading the firmware, and the memory expander 110 may store the metadata MDT by loading the firmware.

In operation S103, the CPU 101 may transmit a management request RQ_mg to the memory expander 110. The management request RQ_mg may be a message or a communication packet for requesting a task data management operation associated with computation of the accelerator 103. For example, the management request RQ_mg may correspond to an M2S RwD (Master to Subordinate Request with Data) message or communication packet of the CXL protocol. In this case, the management request RQ_mg may include a first CXL header CXL_header1 illustrated in FIG. 5B.

The first CXL header CXL_header1 may include a valid field Valid, a memory operation code field MEM opcode, a meta field MetaField, a meta value field MetaValue, a snoop type field SNP Type, an address field Address, a tag field Tag, a traffic class field TC, a poison field Poison, a reserved field RSVD, and a position field Position.

The valid field Valid may include information about whether a relevant request is valid.

The memory operation code field MEM opcode may include information about a memory operation. In an embodiment, the memory operation code field MEM opcode of the management request RQ_mg according to an embodiment of the present disclosure may include information (e.g., "1101", "1110", or "1111") about initiation of a data management operation of the memory expander 110.

The meta field MetaField may include information indicating whether the update of metadata is required. The meta value field MetaValue may include a value of metadata. In an embodiment, the metadata MDT according to an embodiment of the present disclosure and the above metadata may be different.

The snoop type field SNP Type may include information about a snoop type.

The address field Address may include information about a physical address of a host, which is associated with a memory operation code field. In an embodiment, the address field Address of the management request RQ_mg according to an embodiment of the present disclosure may include first address information "address [1]" about a start memory address of data to be managed and second address information "address [2]" about an end memory address of the data to be managed.

The tag field Tag may include tag information for identifying a pre-allocated memory region. In an embodiment, the tag field Tag of the management request RQ_mg according to an embodiment of the present disclosure may include a relevant task number (refer to the task metadata MDT_t).

The traffic class field TC may include information defining a quality of service (QoS) associated with a request.

The poison field Poison may include information indicating whether an error is present in data associated with a request.

The position field Position may include an address of the metadata MDT. The reserved field RSVD may include any other information associated with a request. In an embodiment, compared to the M2S RwD field defined by the CXL standard Version 1.1, the position field Position may be a newly added field. In an embodiment, the position field Position may be omitted, and information associated with the position field Position may be included in the reserved field RSVD or the traffic class field TC.

As described above, the management request RQ_mg according to an embodiment of the present disclosure may be generated by revising some fields of the M2S RwD message defined by the CXL protocol.

In an embodiment, the write request RQ_wr in operation S101 may be replaced with the management request RQ_mg in operation S103. In this case, the CPU 101 may transmit the management request RQ_mg and the metadata MDT to the memory expander 110 at the same time or through one operation. In this case, in response to the management request RQ_mg, the memory expander 110 may store the metadata MDT and may start a management operation for task data.

In an embodiment, in response to the management request RQ_mg, the memory expander 110 may perform the management operation for task data as follows.

In operation S104, the CPU 101 may transmit a first task request RQ_task1 and a first task address dAD_s1 to the accelerator 103. The first task address dAD_s1 may be a start address or an initial address of a data set corresponding to a task allocated to the accelerator 103.

In operation S105, the accelerator 103 may transmit the first task address dAD_s1 and the read request RQ_rd to the memory expander 110.

In operation S106, the memory expander 110 may transmit first data DT1 corresponding to the first address AD1 to the accelerator 103. For example, the memory expander 110 may be in a mode of performing the management operation for task data, in response to the management request RQ_mg in operation S103. In this case, in response to the read request RQ_rd and the first task address dAD_s1 from the accelerator 103, the memory expander 110 may look up a task corresponding to the first task address dAD_s1 based on the metadata MDT and may check a read count corresponding to the found task. The read count may indicate the number of transmitted unit data. The memory expander 110 may provide the accelerator 103 with data of an address corresponding to a sum of the first task address dAD_s1 and the read count. When the read count is "0" (i.e., in the case of the first task data output), in operation S106, the first data DT1 corresponding to the first address AD1 may be transmitted to the accelerator 103.

In operation S107, the accelerator 103 may perform computation on the first data DT1. In operation S108, the accelerator 103 may transmit a computation result of the first data DT1, that is, first result data RST1, a first result address rAD_s1, and the write request RQ_wr to the memory expander 110.

In operation S109, the memory expander 110 may store the first result data RST1. For example, the memory expander 110 may be in a mode of performing the management operation for task data, in response to the management request RQ_mg in operation S103. In this case, in response to the write request RQ_wr and the first result address rAD_s1 from the accelerator 103, the memory expander 110 may look up a task corresponding to the first result address rAD_s1 based on the metadata MDT and may check a write count corresponding to the found task. The write count may indicate the number of result data received from the accelerator 103. The memory expander 110 may store the received task data at an address corresponding to a sum of the first result address rAD_s1 and the write count. When the write count is "0" (i.e., in the case of the first result data), in operation S109, the first result data RST1 may be stored in a memory region corresponding to the first result address rAD_s1.

In operation S110, the accelerator 103 may transmit the read request RQ_rd and the first task address dAD_s1 to the memory expander 110. In an embodiment, the accelerator 103 may perform operation S110 in response to that a response to the request in operation S108 is received from the memory expander 110. Operation S110 may be the same as operation S105.

In operation S111, the memory expander 110 may transmit second data DT2 corresponding to a second address AD2 to the accelerator 103 in response to the read request RQ_rd and the first task address dAD_s1. For example, as described above, operation S110 may be the same as operation S105. However, because the memory expander 110 is in the mode of performing the management operation for task data, the memory expander 110 may output different data depending on the read count with regard to read requests for the same address. That is, in operation S111, the read count may be "1" (e.g., because the first data DT1 are output in operation S106). In this case, the memory expander 110 may provide the accelerator 103 with the second data DT2 of the second address AD2 corresponding to a sum of the first task address dAD_s1 and the read count of "1". In other words, in the case where the memory expander 110 operates in a management mode, even though read requests are received from the accelerator 103 together with the same address, different unit data may be output depending on the read count.

In operation S112, the accelerator 103 may perform computation on the second data DT2. In operation S113, the accelerator 103 may transmit a computation result of the second data DT2, that is, second result data RST2, the first result address rAD_s1, and the write request RQ_wr to the memory expander 110.

In operation S114, the memory expander 110 may store the second result data RST2. In an embodiment, the memory expander 110 may store the second result data RST2 in a manner similar to that described in operation S109. For example, the memory expander 110 may look up a task corresponding to the first result address rAD_s1 based on the metadata MDT and may check a write count corresponding to the found task. The memory expander 110 may store the received task data at an address corresponding to a sum of the first result address rAD_s1 and the write count. When the write count is "1" (i.e., in the case of the second result data), in operation S114, the second result data RST2 may be stored in a memory region corresponding to a sum of the first result address rAD_s1 and the write count of "1". In other words, in the case where the memory expander 110 operates in the management mode, even though write requests are received from the accelerator 103 together with the same address, result data may be stored at different memory regions depending on the write counts.

Afterwards, the accelerator 103 and the memory expander 110 may perform operation S115 to operation S117. Operation S115 to operation S117 are similar to those described above, and thus additional description will be omitted to avoid redundancy.

As described above, according to an embodiment of the present disclosure, the memory expander 110 may perform the management operation for task data in response to the management request RQ_mg from the CPU 101. In this case, without additional intervention of the CPU 101, the accelerator 103 may receive a plurality of task data from the memory expander 110, may perform computation on the received task data, and may store a plurality of result data in the memory expander 110. That is, as described with reference to FIG. 2, while the accelerator 103 repeatedly performs a plurality of computation, because an interrupt is not generated from the accelerator 103, the CPU 101 may perform any other operations. Accordingly, the utilization of the CPU 101 may be improved.

Figure 6:
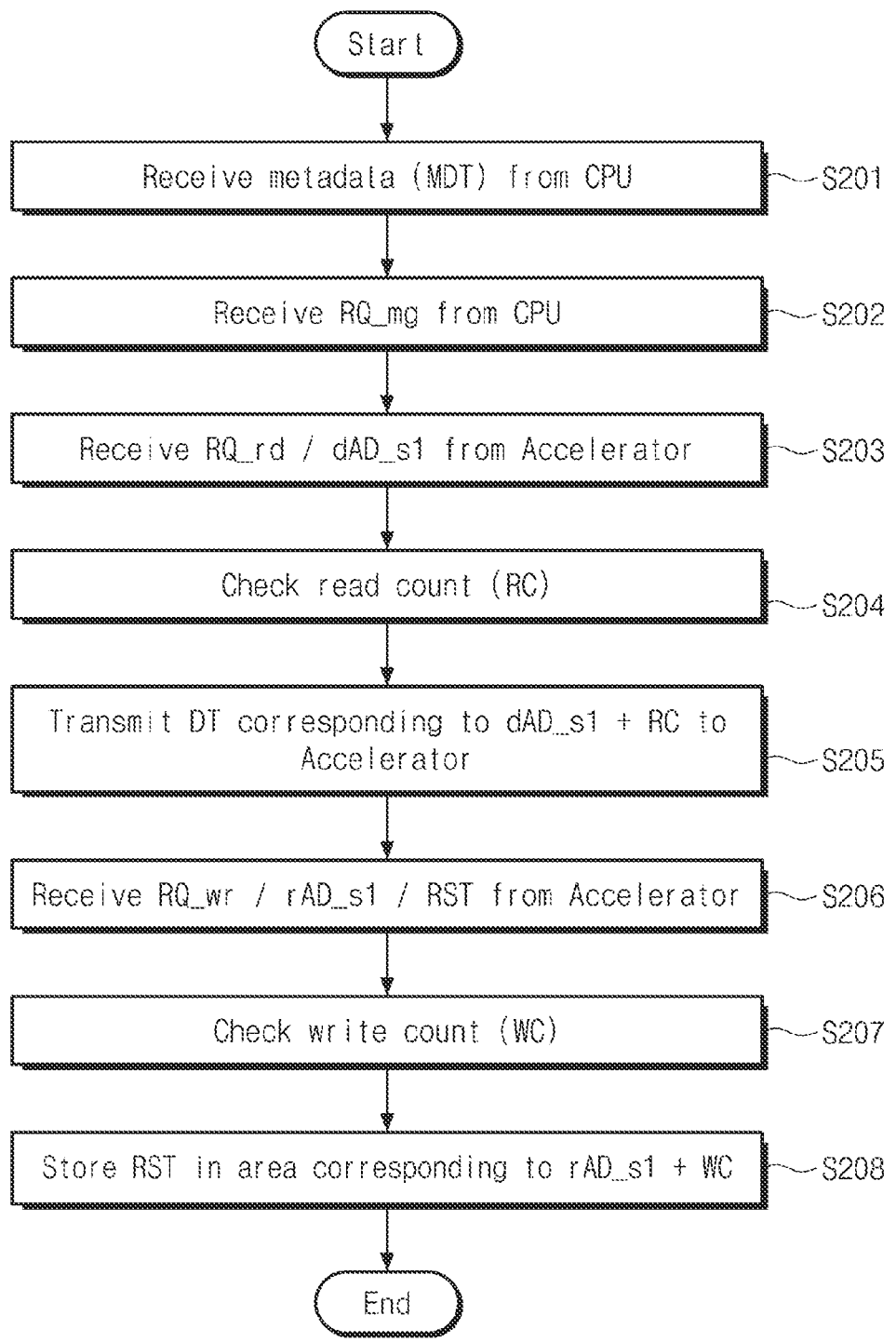
FIG. 6 is a flowchart illustrating an operation of a memory expander of FIG. 1.

FIG. 6 is a flowchart illustrating an operation of a memory expander of FIG. 1. Referring to FIGS. 1 and 6, in operation S201, the memory expander 110 may receive the metadata MDT from the CPU 101. The memory expander 110 may store and manage the metadata MDT thus received.

In operation S202, the memory expander 110 may receive the management request RQ_mg from the CPU 101. The management request RQ_mg may include the first CXL header described with reference to FIG. 6. The memory expander 110 may perform the management operation for task data in response to the management request RQ_mg.

In operation S203, the memory expander 110 may receive the read request RQ_rd and the first task address dAD_s1 from the accelerator 103.

In operation S204, the memory expander 110 may check a read count RC. For example, the memory expander 110 may look up a task corresponding to the first task address dAD_s1 based on the metadata MDT and may check the read count RC corresponding to the found task.

In operation S205, the memory expander 110 may transmit, to the accelerator 103, data stored in a memory region corresponding to a sum (i.e., dAD_s1+RC) of the read count RC and the first task address dAD_s1. In an embodiment, after operation S205, the memory expander 110 may increase a value of the read count RC corresponding to the found task as much as "1".

In operation S206, the memory expander 110 may receive the result data RST, the first result address rAD_s1, and the write request RQ_wr from the accelerator 103.

In operation S207, the memory expander 110 may check a write count WC. For example, the memory expander 110 may look up a task corresponding to the first result address rAD_s1 based on the metadata MDT and may check the write count WC corresponding to the found task.

In operation S208, the memory expander 110 may store the result data RST in a memory region corresponding to a sum (i.e., rAD_s1+WC) of the write count WC and the first result address rAD_s1. In an embodiment, after operation S208, the memory expander 110 may increase a value of the write count WC corresponding to the found task as much as "1".

As described above, in the case where the memory expander 110 performs the management operation, the memory expander 110 may output task data based on the metadata MDT, in response to the read request RQ_rd received from the accelerator 103. Alternatively, in the case where the memory expander 110 performs the management operation, the memory expander 110 may store result data based on the metadata MDT, in response to the write request RQ_wr received from the accelerator 103.

Figure 7:
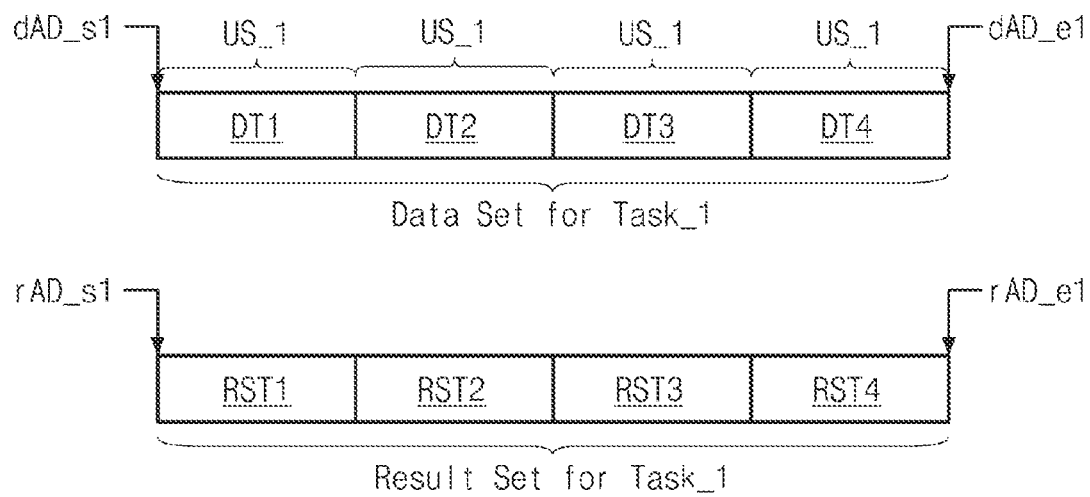
FIG. 7 is a diagram illustrating a data set managed by a memory expander of FIG. 1 based on a unit size.

FIG. 7 is a diagram illustrating a data set managed by a memory expander of FIG. 1 based on a unit size. Referring to FIGS. 1 and 7, the memory device 112 may store a data set for a first task Task_1. The data set for the first task Task_1 may be stored in a memory region between a first task start address dAD_s1 and a first task end address dAD_e1. In the case where the data set for the first task Task_1 is divided based on a first unit size US_1, the data set for the first task Task_1 may be divided into first to fourth data DT1 to DT4, and each of the first to fourth data DT1 to DT4 may have the first unit size US_1.

In an embodiment, result data set for the first task Task_1 may be stored in a memory region between a first result start address rAD_s1 and a first result end address rAD_e1. The memory region between the first task start address dAD_s1 and the first task end address dAD_e1 and the memory region between the first result start address rAD_s1 and the first result end address rAD_e1 may be different memory regions or may at least partially overlap each other.

In the case where the data set for the first task Task_1 is divided based on the first unit size US_1, the result data set for the first task Task_1 may also be divided based on the first unit size US_1. In this case, the result data set for the first task Task_1 may be divided into first to fourth result data RST1 to RST4.

In an embodiment, the first result data RST1 may indicate a result of computation for the first data DT1, the second result data RST2 may indicate a result of computation for the second data DT2, the third result data RST3 may indicate a result of computation for the third data DT3, and the fourth result data RST4 may indicate a result of computation for the fourth data DT4. That is, an order in which result data are sequentially stored may be the same as an order in which unit data are sequentially output. However, the present disclosure is not limited thereto. For example, result data may be stored non-sequentially. For example, the first result data RST1 may indicate a result of computation for the third data DT3, the second result data RST2 may indicate a result of computation for the first data DT1, the third result data RST3 may indicate a result of computation for the fourth data DT4, and the fourth result data RST4 may indicate a result of computation for the second data DT2. The order of storing result data may be variously changed or modified depending on a characteristic of a computation operation.

Figure 8:
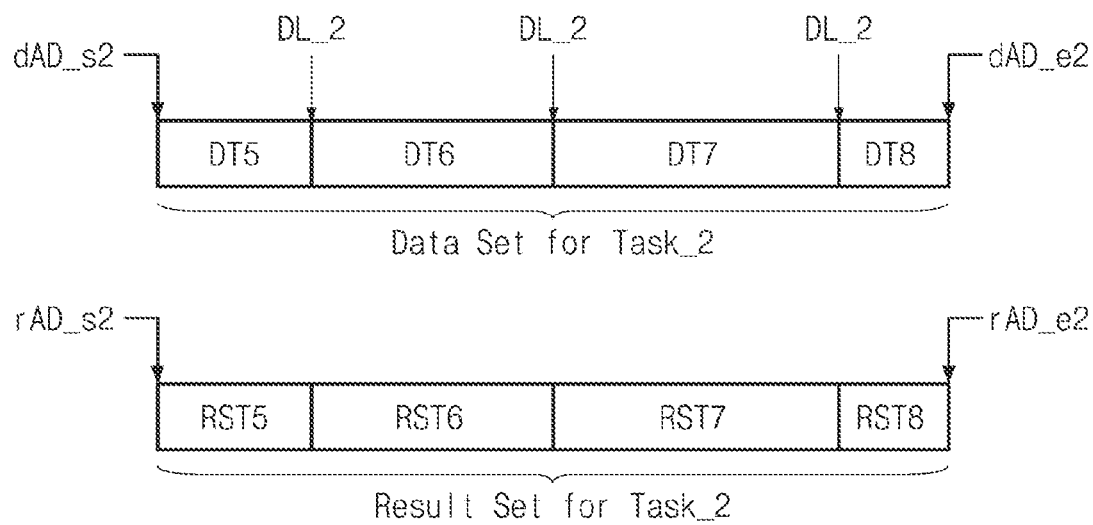
FIG. 8 is a diagram illustrating a data set managed by a memory expander of FIG. 1 based on a delimiter.

FIG. 8 is a diagram illustrating a data set managed by a memory expander of FIG. 1 based on a delimiter. Referring to FIGS. 1 and 8, the memory device 112 may store a data set for a second task Task_2. The data set for the second task Task_2 may be stored in a memory region between a second task start address dAD_s2 and a second task end address dAD_e2. In the case where the data set for the second task Task_2 is divided based on a second delimiter DL_2, the data set for the second task Task_2 may be divided into fifth to eighth data DT5 to DT8, and the fifth to eighth data DT5 to DT8 may have different sizes.

A result data set for the second task Task_2 may be stored in a memory region between a second result start address rAD_s2 and a second result end address rAD_e2. The memory region between the second task start address dAD_s2 and the second task end address dAD_e2 and the memory region between the second result start address rAD_s2 and the second result end address rAD_e2 may be different memory regions or may at least partially overlap each other.

The result data set for the second task Task_2 may be divided into fifth to eighth result data RST5 to RST8, and sizes of the fifth to eighth result data RST5 to RST8 may correspond to sizes of the fifth to eighth data DT5 to DT8, respectively. In an embodiment, the order of storing result data may be variously changed or modified as described with reference to FIG. 7, and thus additional description will be omitted to avoid redundancy.

Figure 9:
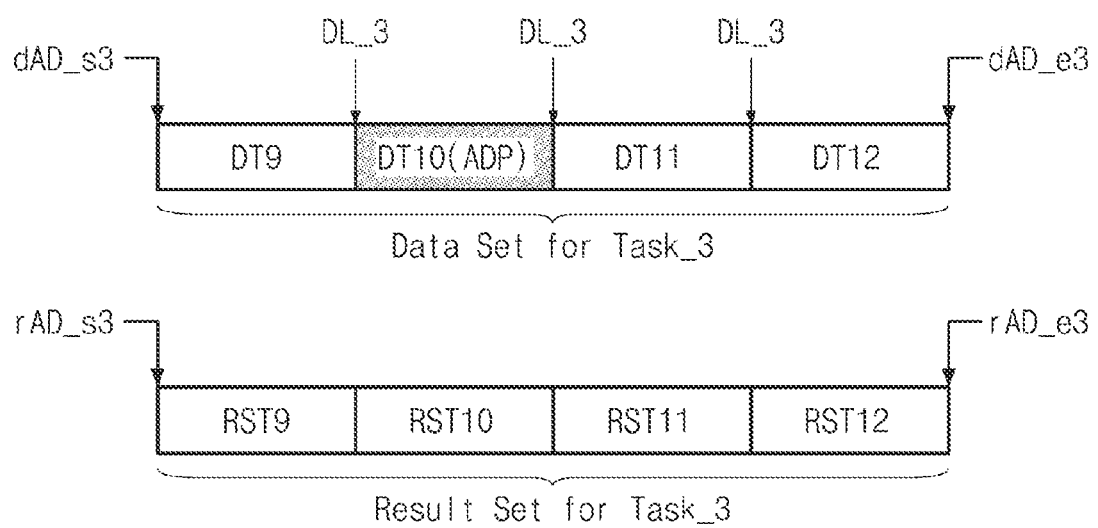
FIG. 9 is a diagram illustrating a data set managed by a memory expander of FIG. 1.
Figure 10:
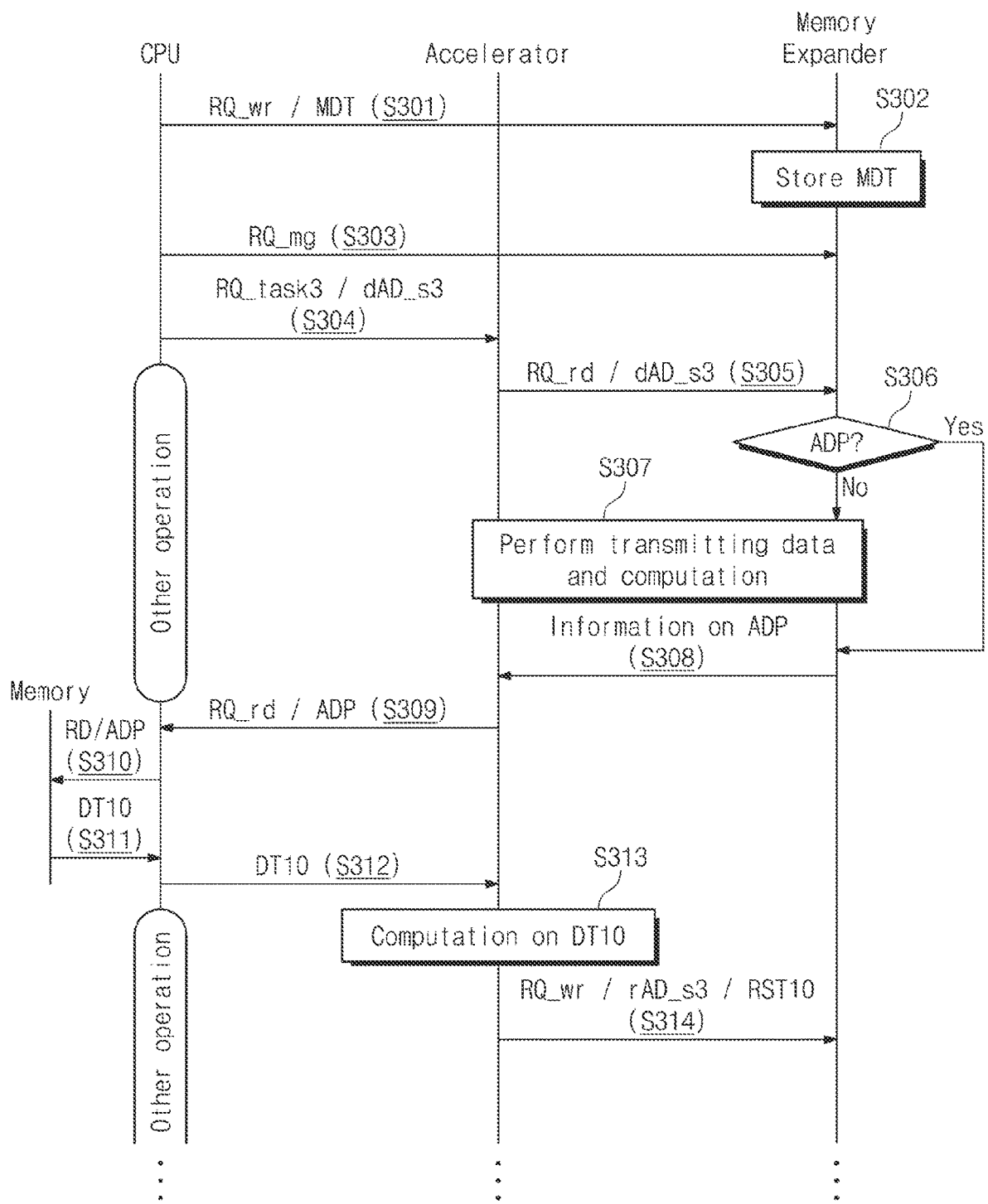
FIG. 10 is a flowchart for describing an operation according to an embodiment of FIG. 9.

FIG. 9 is a diagram illustrating a data set managed by a memory expander of FIG. 1. FIG. 10 is a flowchart for describing an operation according to an embodiment of FIG. 9. Referring to FIGS. 1, 9, and 10, the memory device 112 may store a data set for a third task Task_3. The data set for the third task Task_3 may be stored in a memory region between a third task start address dAD_s3 and a third task end address dAD_e3. In the case where the data set for the third task Task_3 is divided based on a third delimiter DL_3, the data set for the third task Task_3 may be divided into ninth to twelfth data DT9 to DT12. A result data set (e.g., RST9 to RST12) for the third task Task_3 may be stored in a memory region between a third result start address rAD_s3 and a third result end address rAD_e3.

In an embodiment, a part (e.g., the tenth data DT10) of the ninth to twelfth data DT9 to DT12 may not be stored in the memory device 112. In this case, the tenth data DT10 may be stored in the memory 102 directly connected with the CPU 101, and the memory expander 110 may include an address point ADP of the tenth data DT10 instead of the tenth data DT10. The address point ADP may indicate information about a position where the tenth data DT10 are actually stored (i.e., information about an address of the memory 102).

At a time when the tenth data DT10 are output, the memory expander 110 may provide the address point ADP corresponding to the tenth data DT10 to the accelerator 103. The accelerator 103 may receive the tenth data DT10 from the CPU 101 based on the address point ADP.

For example, as illustrated in FIG. 10, the CPU 101, the accelerator 103, and the memory expander 110 may perform operation S301 to operation S305. Operation S301 to operation S305 are similar to operation S101 to operation S105 of FIG. 5A except that an initial address of task data is the third task start address dAD_s3, and thus additional description will be omitted to avoid redundancy.

In operation S306, the memory expander 110 may determine whether the address point ADP is stored in a memory region corresponding to task data to be transmitted to the accelerator 103. When it is determined that the address point ADP is not stored in the memory region corresponding to the task data to be transmitted to the accelerator 103, in operation S307 the memory expander 110 and the accelerator 103 may perform operations associated with transmitting and computing task data. Operation S307 is similar to the operations described with reference to FIG. 5A, that is, operations of exchanging task data between the memory expander 110 and the accelerator 103 and performing computation for data, and thus additional description will be omitted to avoid redundancy.

When it is determined that the address point ADP is stored in the memory region corresponding to the task data to be transmitted to the accelerator 103, in operation S308, the memory expander 110 may transmit information about the address point ADP to the accelerator 103.

In operation S309, the accelerator 103 may transmit the address point ADP and the read request RQ_rd to the CPU 101 in response to the address point ADP received from the memory expander 110.

In operation S310, the CPU 101 may transmit a read command RD and the address point ADP to the memory 102 in response to the read request RQ_rd; in operation S311, the memory 102 may transmit the tenth data DT10 corresponding to the address point ADP to the CPU 101. In an embodiment, operation S310 and operation S311 may be performed based on a communication interface (e.g., a DDR interface) between the CPU 101 and the memory 102.

In operation S312, the CPU 101 may transmit the tenth data DT10 to the accelerator 103. The accelerator 103 and the memory expander 110 may perform operation S313 and operation S314. Operation S313 and operation S413 are similar to a data computing operation and a result data storing operation described with reference to FIG. 5A, and thus additional description will be omitted to avoid redundancy.

As described above, instead of storing actual data corresponding to a part of a task data set, the memory expander 110 may store address point information of the actual data. In this case, before the management operation is performed, even though the whole task data set is not stored in the memory expander 110, a process of receiving task data from the CPU 101 may be omitted, and thus, the overall performance of the computing device 100 may be improved.

Figure 11A:
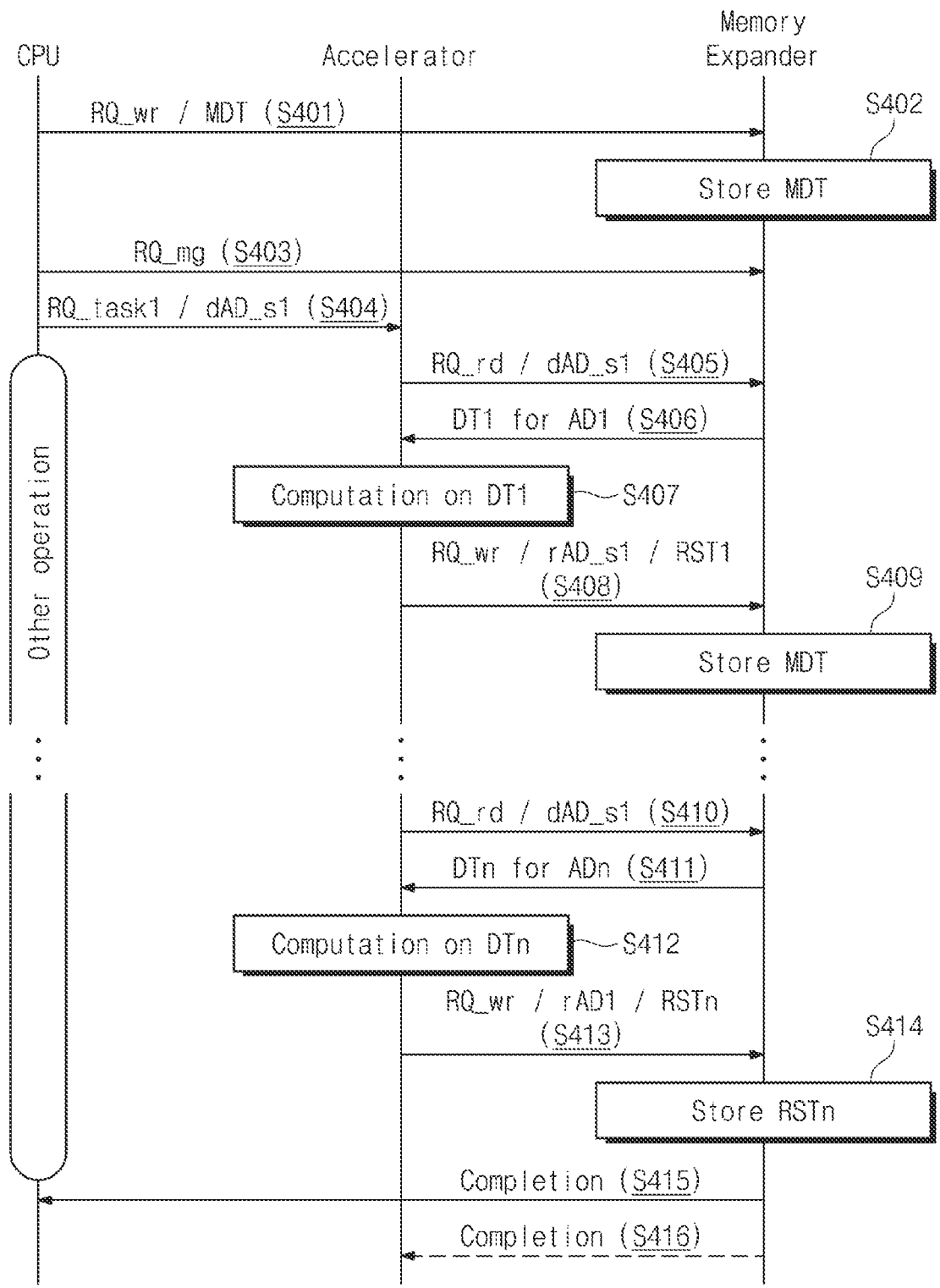
FIG. 11A is a diagram illustrating an operation of a computing system of FIG. 1.

FIG. 11A is a diagram illustrating an operation of a computing system of FIG. 1. FIG. 11B is a diagram illustrating header information of a completion of FIG. 11A. Referring to FIGS. 1, 11A, and 11B, the CPU 101, the accelerator 103, and the memory expander 110 may perform operation S401 to operation S414. Operation S401 to operation S414 are similar to a metadata storing operation, a management operation initiation request, a task data read operation, a task data computation operation, and a result data storing operation described with reference to FIG. 5A, and thus additional description will be omitted to avoid redundancy.

In an embodiment, n-th data DTn transmitted from the memory expander 110 to the accelerator 103 through operation S410 to operation S411 may be the last task data or the last unit data associated with an allocated task.

In this case, after result data RSTn being a computation result of the n-th data DTn are stored in the memory expander 110 (i.e., after operation S414), in operation S415, the memory expander 110 may transmit a completion associated with the allocated task to the CPU 101. In response to the received completion, the CPU 101 may recognize that the allocated task is completed and may allocate a next task.

In an embodiment, after all allocated tasks are completed, in operation S416, the memory expander 110 may transmit a completion to the accelerator 103. In response to the received completion, the accelerator 103 may recognize that the allocated task is completed.

In an embodiment, after transmitting the completion to the CPU 101, the memory expander 110 may stop the management operation. In this case, as the new management request RQ_mg is transmitted from the CPU 101 to the memory expander 110, the memory expander 110 may again perform the management operation. Alternatively, after transmitting the completion to the CPU 101, the memory expander 110 may continue to perform the management operation until an explicit request for stopping the management operation is received from the CPU 101.

In an embodiment, the completion associated with the allocated task may have a structure of an S2M DRS(Subordinate to Master Data Response) message or communication packet that is based on the CXL protocol. For example, the completion may include a second CXL header CXL_header2 illustrated in FIG. 11B.

The second CXL header CXL_header2 may include a valid field Valid, a memory operation code field MEM opcode, a meta field MetaField, a meta value field MetaValue, a tag field Tag, a traffic class field TC, a poison field Poison, a reserved field RSVD, and a position field Position. Each field of the second CXL header CXL_header2 is described with reference to FIG. 5B, and thus additional description will be omitted to avoid redundancy.

In an embodiment, the memory operation code field MEM opcode included in the completion according to the present disclosure may include information about a processing result of an allocated task (e.g., information indicating "normal", "abnormal", "error", or "interruption"). The tag field Tag included in the completion according to the present disclosure may include information about a task number of a completed task. The position field Position included in the completion according to the present disclosure may include information about an address of result data. The reserved field RSVD included in the completion according to the present disclosure may include various statistical information (e.g., a throughput, a processing time, and a processing error count) about an allocated task.

In an embodiment, as in the above description given with reference to FIG. 5B, the position field Position of FIG. 11B may be newly added to a field of an S2M DRS defined by the CXL standard Version 1.1. Alternatively, the position field Position of FIG. 11B may be omitted, and information associated with the position field Position may be included in the reserved field RSVD or the traffic class field TC.

Figure 12:
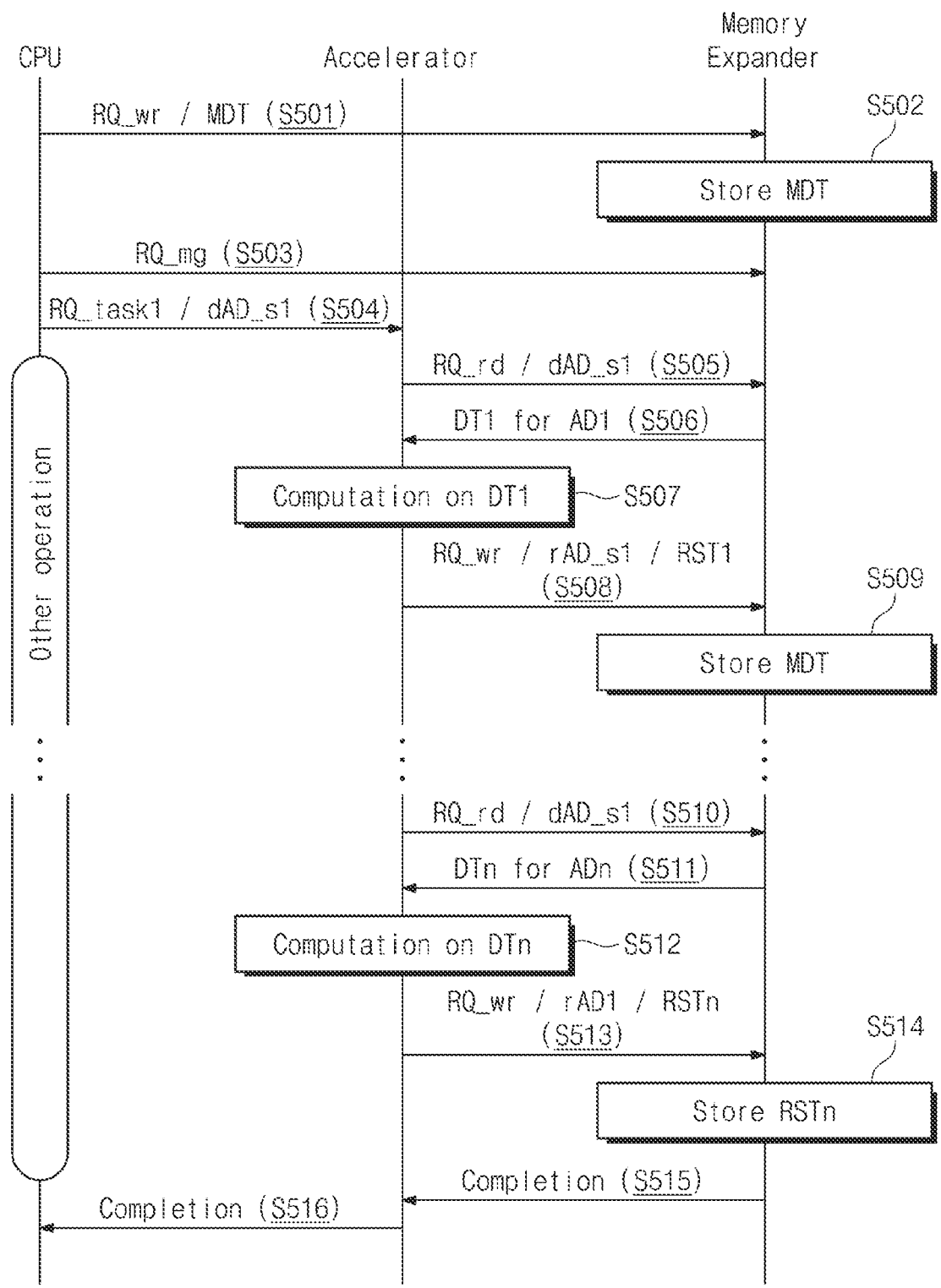
FIG. 12 is a flowchart illustrating an operation of a computing device of FIG. 1.

FIG. 12 is a flowchart illustrating an operation of a computing device of FIG. 1. Referring to FIGS. 1 and 12, the CPU 101, the accelerator 103, and the memory expander 110 may perform operation S501 to operation S514. Operation S501 to operation S514 are similar to a metadata storing operation, a management operation initiation request, a task data read operation, a task data computation operation, and a result data storing operation described with reference to FIG. 5A, and thus additional description will be omitted to avoid redundancy.

In an embodiment, the n-th data DTn transmitted from the memory expander 110 to the accelerator 103 through operation S510 to operation S511 may be the last task data or the last unit data associated with an allocated task.

In this case, after the result data RSTn being a computation result of the n-th data DTn are stored in the memory expander 110 (i.e., after operation S514), in operation S515, the memory expander 110 may transmit a completion associated with the allocated task to the accelerator 103. In operation S516, the accelerator 103 may transmit a completion to the CPU 101 in response to the completion from the memory expander 110. A packet structure of the completion is similar to that described with reference to FIGS. 11A and 11B except that a completion is provided from the memory expander 110 to the CPU 101 through the accelerator 103, and thus additional description will be omitted to avoid redundancy.

Figure 13:
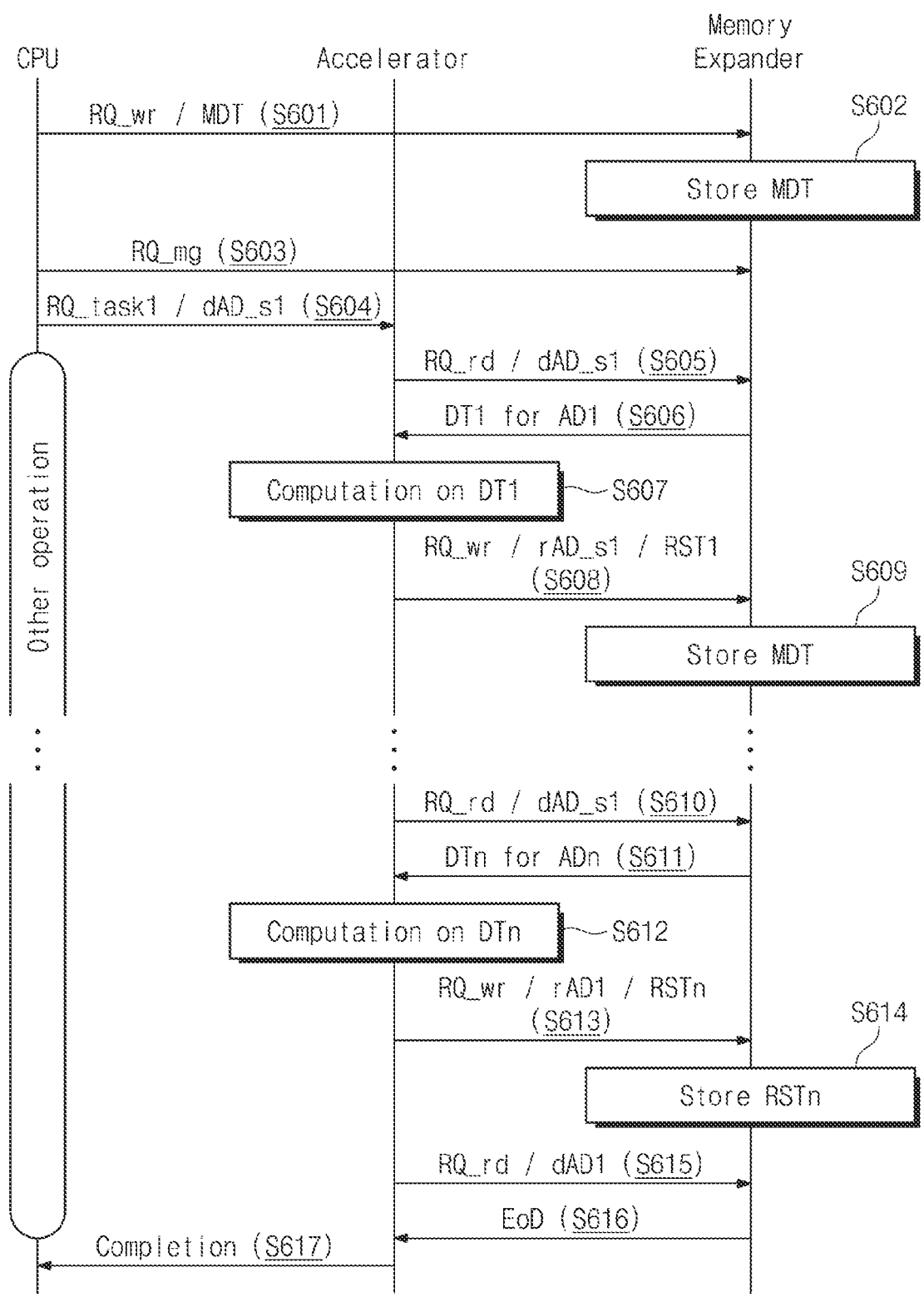
FIG. 13 is a flowchart illustrating an operation of a computing device of FIG. 1.

FIG. 13 is a flowchart illustrating an operation of a computing device of FIG. 1. Referring to FIGS. 1 and 13, the CPU 101, the accelerator 103, and the memory expander 110 may perform operation S601 to operation S614. Operation S601 to operation S614 are similar to a metadata storing operation, a management operation initiation request, a task data read operation, a task data computation operation, and a result data storing operation described with reference to FIG. 5A, and thus additional description will be omitted to avoid redundancy.

In an embodiment, the n-th data DTn transmitted from the memory expander 110 to the accelerator 103 through operation S610 to operation S611 may be the last task data or the last unit data associated with an allocated task.

In this case, the result data RSTn being a computation result of the n-th data DTn may be stored in the memory expander 110 (operation S614). Afterwards, in operation S615, the read request RQ_rd and the first task address dAD_s1 may be received from the accelerator 103. The memory expander 110 may check that the last unit data are transmitted to the accelerator 103, based on the metadata MDT and a read count (or a value of a read counter). In this case, in operation S616, the memory expander 110 may transmit end data EoD to the accelerator 103. In response to the end data EoD, the accelerator 103 may recognize that the allocated task is completed. In operation S617, the accelerator 103 may transmit a completion to the CPU 101.

As described above, one task may include computation operations for a plurality of unit data. In the case where one task is completed, a completion may be transmitted from the accelerator 103 or the memory expander 110 to the CPU 101. That is, compared to the manner described with reference to FIG. 2, an interrupt may be prevented from being frequently generated, and thus, the overall performance of the computing device 100 may be improved.

Figure 14:
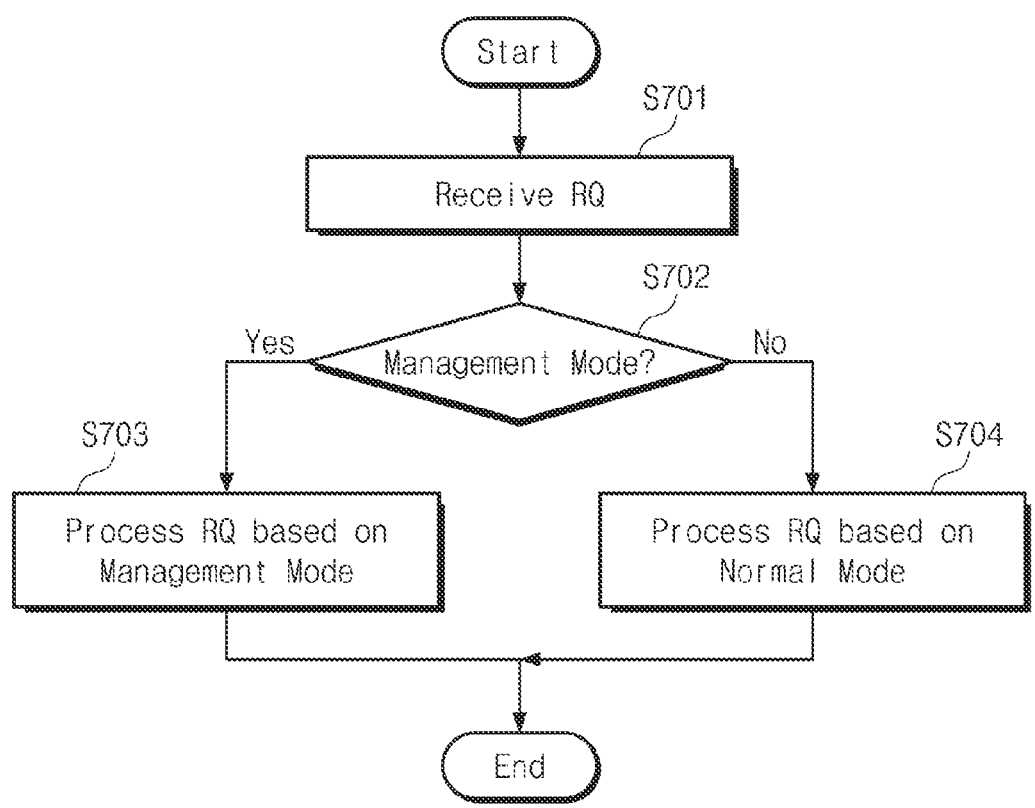
FIG. 14 is a flowchart illustrating an operation of a memory expander of FIG. 1.

FIG. 14 is a flowchart illustrating an operation of a memory expander of FIG. 1. Referring to FIGS. 1 and 14, in operation S701 the memory expander 110 may receive a request RQ. In an embodiment, the request RQ may be a request received from the CPU 101, the accelerator 103, or any other components through the CXL interface.

In operation S702, the memory expander 110 may determine whether a current operation mode is a management mode (i.e., a mode of performing the management operation). For example, as described above, the memory expander 110 may perform the management operation for task data in response to the management request RQ_mg from the CPU 101.

When it is determined that the memory expander 110 is in the management mode, in operation S703, the memory expander 110 may process the request RQ based on the method described with reference to FIGS. 3 to 13, that is, the management mode. When it is determined that the memory expander 110 is not in the management mode, in operation S704 the memory expander 110 may process the request RQ based on a normal mode.

For example, it is assumed that the request RQ is a read request and a first address is received together with the request RQ. In this case, when the memory expander 110 is in the management mode, the memory expander 110 may look up a task corresponding to the first address based on the metadata MDT and may output data of a memory region corresponding to a sum of the first address and a read count corresponding to the found task. In contrast, when the memory expander 110 is not in the management mode (i.e., in the normal mode), the memory expander 110 may output data of a memory region corresponding to the first address.

In the above embodiments, a configuration is described where the CPU 101 provides the accelerator 103 with the task request RQ_task and the task start address dAD_s and the accelerator 103 transmits the read request RQ_rd and the task start address dAD_s to the memory expander 110, but the present disclosure is not limited thereto. For example, the task start address dAD_s may be replaced with the task number (taskNum) TN and the memory expander 110 may receive a task number from the accelerator 103 and may manage task data and result data corresponding to the received task number, based on the metadata MDT.

Figure 15:
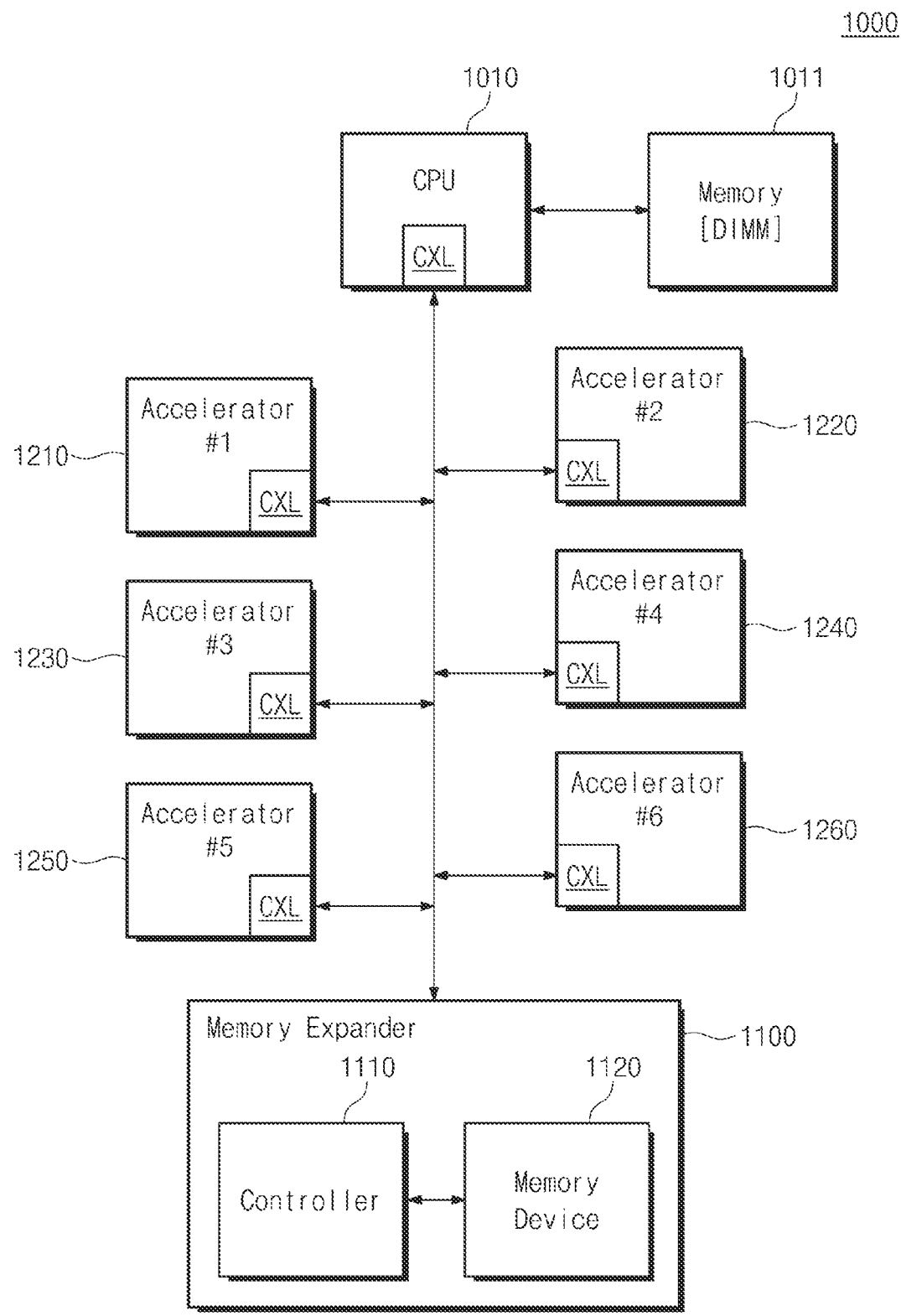
FIG. 15 is a block diagram illustrating a computing device according to an embodiment of the present disclosure.

FIG. 15 is a block diagram illustrating a computing device according to an embodiment of the present disclosure. Referring to FIG. 15, a computing device 1000 may include a CPU 1010, a memory 1011, a plurality of accelerators 1210 to 1260, and a memory expander 1100. The memory expander 1100 may include a controller 1110 and a memory device 1120. The CPU 1010, the memory 1011, the memory expander 1100, the controller 1110, and the memory device 1120 of the computing device 1000 are described with reference to FIG. 1, and thus additional description will be omitted to avoid redundancy. Each of the plurality of accelerators 1210 to 1260 may perform an operation similar to that of the accelerator 103 described with reference to FIG. 1, and thus additional description will be omitted to avoid redundancy.

The CPU 1010, the plurality of accelerators 1210 to 1260, and the memory expander 1100 may communicate with each other through the CXL interfaces. Each of the plurality of accelerators 1210 to 1260 may be configured to perform a computation allocated from the CPU 1010, as described with reference to FIGS. 1 to 14. That is, the plurality of accelerators 1210 to 1260 may be configured to perform parallel computations. The memory expander 1100 may be configured to manage task data to be computed at each of the plurality of accelerators 1210 to 1260 or result data, as described with reference to FIGS. 1 to 14. The communications between the CPU 1010, the plurality of accelerators 1210 to 1260, and the memory expander 1100 are similar to those described with reference to FIGS. 1 to 14 except that the computing device 1000 includes a plurality of accelerators, and thus additional description will be omitted to avoid redundancy. An embodiment of parallel computations using a plurality of accelerators will be more fully described with reference to FIG. 16.

In an embodiment, the number of accelerators 1210 to 1260 included in the computing device 1000 may be variously changed or modified.

Figure 16:
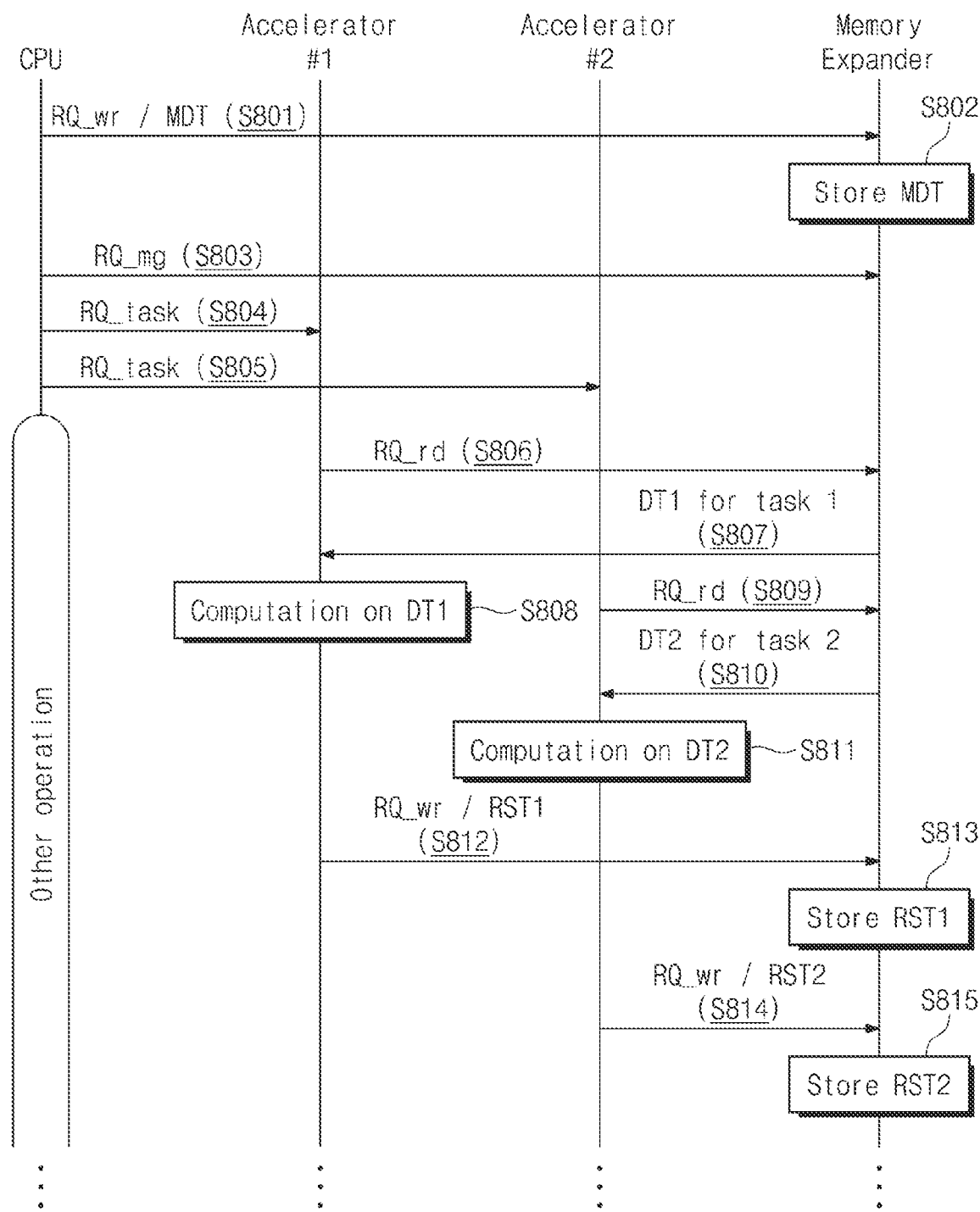
FIG. 16 is a flowchart illustrating an operation of a computing device of FIG. 15.

FIG. 16 is a flowchart illustrating an operation of a computing device of FIG. 15. For convenience of description, parallel computation using the first accelerator 1210 and the second accelerator 1220 will be described. However, the present disclosure is not limited thereto. Referring to FIGS. 15 and 16, the CPU 1010 and the memory expander 1100 may perform operation S801 to operation S803. Operation S801 to operation S803 are similar to operation S101 to operation S103 described with reference to FIG. 5A, and thus additional description will be omitted to avoid redundancy.

In operation S804, the CPU 1010 may transmit the task request RQ_task to the first accelerator 1210. In operation S805, the CPU 1010 may transmit the task request RQ_task to the second accelerator 1220. In an embodiment, the task request RQ_task provided to the first accelerator 1210 and the task request RQ_task provided to the second accelerator 1220 may be associated with the same task. Alternatively, the task request RQ_task provided to the first accelerator 1210 and the task request RQ_task provided to the second accelerator 1220 may be associated with different tasks. Alternatively, the task request RQ_task provided to the first accelerator 1210 and the task request RQ_task provided to the second accelerator 1220 may not include information (e.g., a task number or a task start address) about a task.

Below, it is assumed that the task request RQ_task provided to the first accelerator 1210 and the task request RQ_task provided to the second accelerator 1220 do not include information (e.g., a task number or a task start address) about a task. However, the present disclosure is not limited thereto. In the case where the task request RQ_task provided to the first accelerator 1210 and the task request RQ_task provided to the second accelerator 1220 include information (e.g., a task number or a task start address) about a task, in a read request for task data or a write request for result data, a task number or a task start address may be provided to the memory expander 1100. In this case, the memory expander 1100 may operate as described with reference to FIGS. 1 to 14.

In operation S806, the first accelerator 1210 may transmit the read request RQ_rd to the memory expander 1100. In operation S807, the memory expander 1100 may transmit the first data DT1 for a first task to the first accelerator 1210. For example, in response to the read request RQ_rd, the memory expander 1100 may search the metadata MDT for the first task corresponding to an accelerator identifier of the first accelerator 1210 transmitting the read request RQ_rd. The memory expander 1100 may transmit task data corresponding to the first task thus found, that is, the first data DT1 to the first accelerator 1210. In an embodiment, as described with reference to FIGS. 1 to 14, the first data DT1 may be data output from a memory region corresponding to a sum of the task start address and a read count corresponding to the first task thus found.

In operation S808, the first accelerator 1210 may perform a computation operation on the first data DT1.

In operation S809, the second accelerator 1220 may transmit the read request RQ_rd to the memory expander 1100. In operation S810, in response to the read request RQ_rd from the second accelerator 1220, the memory expander 1100 may transmit the second data DT2 for a second task to the second accelerator 1220. In an embodiment, operation S810 may be similar to operation S807 except that accelerators are different and transmitted data are different, and thus additional description will be omitted to avoid redundancy.

In operation S811, the second accelerator 1220 may perform a computation operation on the second data DT2.

In operation S812, the first accelerator 1210 may transmit the first result data RST1 being a result of the computation operation for the first data DT1 and the write request RQ_wr to the memory expander 1100. In operation S813, the memory expander 1100 may store the first result data RST1 in response to the write request RQ_wr from the first accelerator 1210. In an embodiment, a memory region for storing the first result data RST1 may be determined based on an accelerator identifier of the first accelerator 1210 and the metadata MDT. For example, the memory expander 1100 may search the metadata MDT for a task corresponding to the accelerator identifier of the first accelerator 1210 and may determine a memory region for storing the first result data RST1 based on a result data start address corresponding to the found task and a write count (or a value of a write counter). The remaining components are similar to those described above except for an operation of searching for a task number corresponding to an accelerator identifier, and thus additional description will be omitted to avoid redundancy.

In operation S814, the second accelerator 1220 may transmit the write request RQ_wr and the second result data RST2 to the memory expander 1100. In operation S815, the memory expander 1100 may store the second result data RST2. Operation S815 is similar to operation S814, and thus additional description will be omitted to avoid redundancy.

In an embodiment, the communications between the first and second accelerators 1210 and 1220 and the memory expander 1100 may be performed in parallel. For example, while the first accelerator 1210 performs a computation operation (i.e., operation S808), the second accelerator 1220 and the memory expander 1100 may perform operations of transmitting the read request RQ_rd and transmitting task data. Alternatively, while the second accelerator 1220 performs a computation operation (i.e., operation S811), the first accelerator 1210 and the memory expander 1100 may perform operations of transmitting the write request RQ_wr and transmitting result data.

As described above, the memory expander 1100 according to an embodiment of the present disclosure may be configured to manage task data to be processed by a plurality of accelerators and result data processed by the plurality of accelerators.

In an embodiment, depending on a task allocation manner of the CPU 1010, the plurality of accelerators 1210 to 1260 may be configured to process the same tasks in parallel or to process different tasks.

Figure 17:
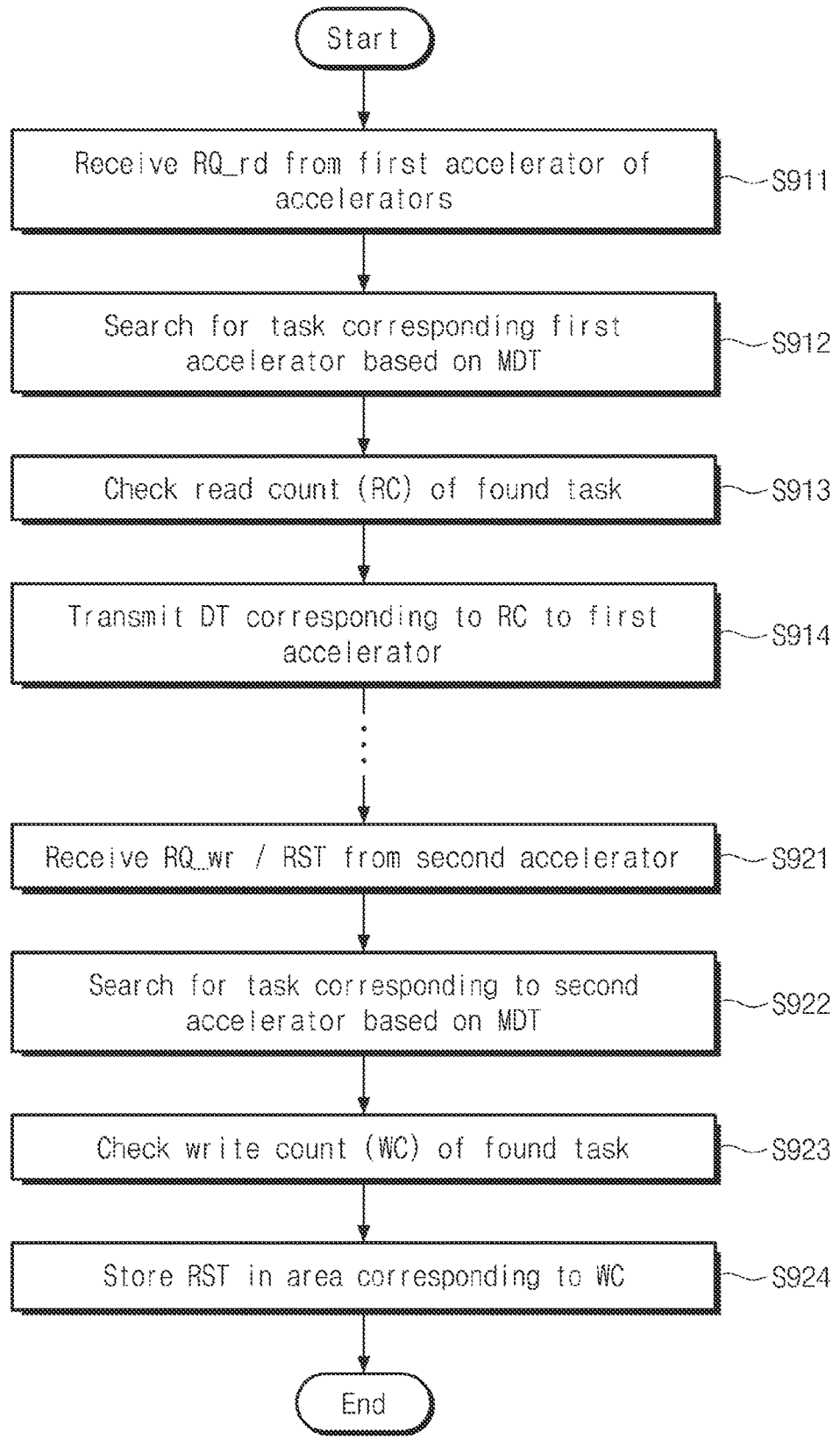
FIG. 17 is a flowchart illustrating an operation of a memory expander of FIG. 15.

FIG. 17 is a flowchart illustrating an operation of a memory expander of FIG. 15. Referring to FIGS. 15 and 17, in operation S911 the memory expander 1100 may receive the read request RQ_rd from the first accelerator 1210 among the plurality of accelerators 1210 to 1260. In an embodiment, the read request RQ_rd may include the task start address described with reference to FIG. 5A. Alternatively, the read request RQ_rd may include information (e.g., a task number) about a task to be processed by the first accelerator 1210. Alternatively, the read request RQ_rd may include information (e.g., an accelerator identifier) about the first accelerator 1210.

In operation S912, the memory expander 1100 may look up a task corresponding to the first accelerator 1210 based on the metadata MDT. For example, the memory expander 1100 may search for a relevant task based on at least one (e.g., a task start address, a task number, or an accelerator identifier) of information included in the read request RQ_rd.

In operation S913, the memory expander 1100 may check a read count of the found task. In operation S914, the memory expander 1100 may transmit data corresponding to the read count to the first accelerator 1210. Operation S913 and operation S914, that is, the read count checking operation and the data transmitting operation are similar to the read count checking operation and the data transmitting operation described with reference to FIG. 6, and thus additional description will be omitted to avoid redundancy.

In an embodiment, after data are transmitted to the first accelerator 1210, the memory expander 1100 may increase the read count of the found task as much as "1".

For convenience of description, a configuration in which task data are transmitted to the first accelerator 1210 is described, but the present disclosure is not limited thereto. For example, a task data transmitting operation associated with each of the remaining accelerators may be performed to be similar to the manner described with reference to operation S911 to operation S914.

In operation S921, the memory expander 1100 may receive the write request RQ_wr and the second result data RST2 from the second accelerator 1220. In an embodiment, as in the above description given with reference to operation S911, the write request RQ_wr may include a result start address, information (e.g., a task number) about a processed task, or information such as an accelerator identifier.

In operation S922, the memory expander 1100 may search for a task corresponding to the second accelerator 1220 based on the metadata MDT. The search operation, that is operation S922, is similar to operation S912, and thus additional description will be omitted to avoid redundancy.

In operation S923, the memory expander 1100 may check a write count of the found task. In operation S924, the memory expander 1100 may store result data in a region corresponding to the write count. Operation S923 and operation S924 are similar to the write count checking operation and the result data storing operation described with reference to FIG. 5A, and thus additional description will be omitted to avoid redundancy.

For convenience of description, a configuration in which result data from the second accelerator 1220 are stored is described, but the present disclosure is not limited thereto. For example, result data received from each of the remaining accelerators may be stored to be similar to the manner described with reference to operation S921 to operation S924.

Figure 18A:
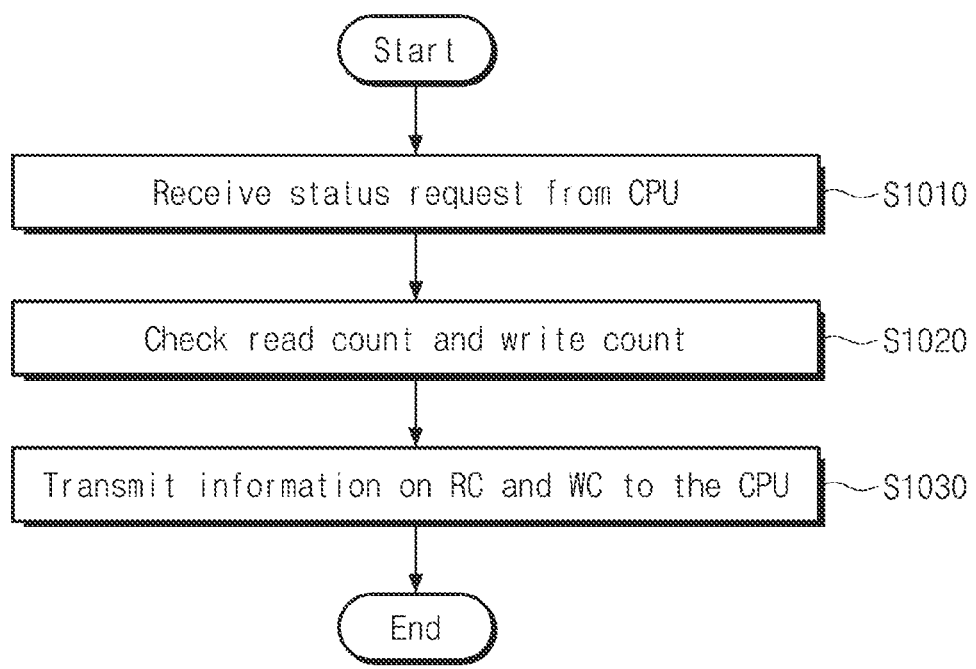
FIG. 18A is a flowchart illustrating an operation of a memory expander according to an embodiment of the present disclosure.

FIG. 18A is a flowchart illustrating an operation of a memory expander according to an embodiment of the present disclosure. FIG. 18B is a diagram illustrating header information included in a status request in operation S1010 of FIG. 18A. For convenience of description, the description will be given in which an operation according to the flowchart of FIG. 18A is performed by the memory expander 1100 of FIG. 15. However, the present disclosure is not limited thereto.

Referring to FIGS. 15, 18A, and 18B, in operation S1010, the memory expander 110 may receive a status request from the CPU 1010. For example, the CPU 1010 may allocate various tasks to the plurality of accelerators 1210 to 1260 and may request the memory expander 1100 to perform a management operation on task data to be processed by the plurality of accelerators 1210 to 1260. Without the intervention of the CPU 1010, the memory expander 1100 may manage task data and result data based on the metadata MDT. While various tasks are performed, the CPU 1010 may check progress states of the tasks being performed. In this case, the CPU 1010 may transmit the status request to the memory expander 1100.

In an embodiment, the status request may be an M2S Req (Master to Subordinate Request) message or communication packet of the CXL protocol. For example, the status request may include a third CXL header CXL_header3 illustrated in FIG. 18B. The third CXL header CXL_header3 may include a valid field Valid, a memory operation code field MEM opcode, a meta field MetaField, a meta value field Meta-Value, a snoop type field SNP Type, an address field Address, a tag field Tag, a traffic class field TC, and a reserved field RSVD. Each field of the third CXL header CXL_header3 is described above, and thus additional description will be omitted to avoid redundancy.

In an embodiment, the memory operation code field MEM opcode of the status request according to an embodiment of the present disclosure may be set to various values (e.g., "1101", "1110", or "1111") depending on a type of a command for inquiring about a processing state of data included in the memory expander 1100. In an embodiment, the type of the command for inquiring about a processing state may include the following types: simple inquiry, interruption after inquiry, and wait after inquiry.

In an embodiment, the tag field Tag of the status request according to an embodiment of the present disclosure may include information about a task number.

In an embodiment, the address field Address of the status request according to an embodiment of the present disclosure may indicate a range of inquiry request data. In an embodiment, the inquiry request data may indicate task data to be checked with regard to a processing state.

In an embodiment, the reserved field RSVD of the status request according to an embodiment of the present disclosure may include information such as an inquiry request unit or an inquiry request time.

Header information of the above inquiry request is provided as an example, and the present disclosure is not limited thereto.

In operation S1020, the memory expander 1100 may check a read count and a write count. For example, based on the read count or the write count, the memory expander 1100 may determine whether data corresponding to an address field included in the status request are processed. In detail, a read count associated with a first task of "10" may indicate that first to tenth task data of a plurality of task data corresponding to the first task are transmitted to an accelerator. Alternatively, a write count associated with the first task of "10" may indicate that first to tenth result data of a plurality of result data corresponding to the first task are stored in the memory expander 1100. That is, a state of a currently processed task may be checked based on a read count (or a value of a read counter) and a write count (or a value of a write counter).

In operation S1030, the memory expander 1100 may provide the CPU 1010 with information about the read count and the write count. The CPU 1010 may check a progress state of a current task based on the information received from the memory expander 1100.

As described above, according to the present disclosure, a memory expander may perform a data management operation for each of a plurality of accelerators. In this case, a CPU may not separately control the plurality of accelerators and each of the plurality of accelerators may not generate a separate interrupt to the CPU until a task of a specific unit is completed. Accordingly, the performance of a computing device may be improved, and the utilization of the CPU may be improved.

Figure 19:
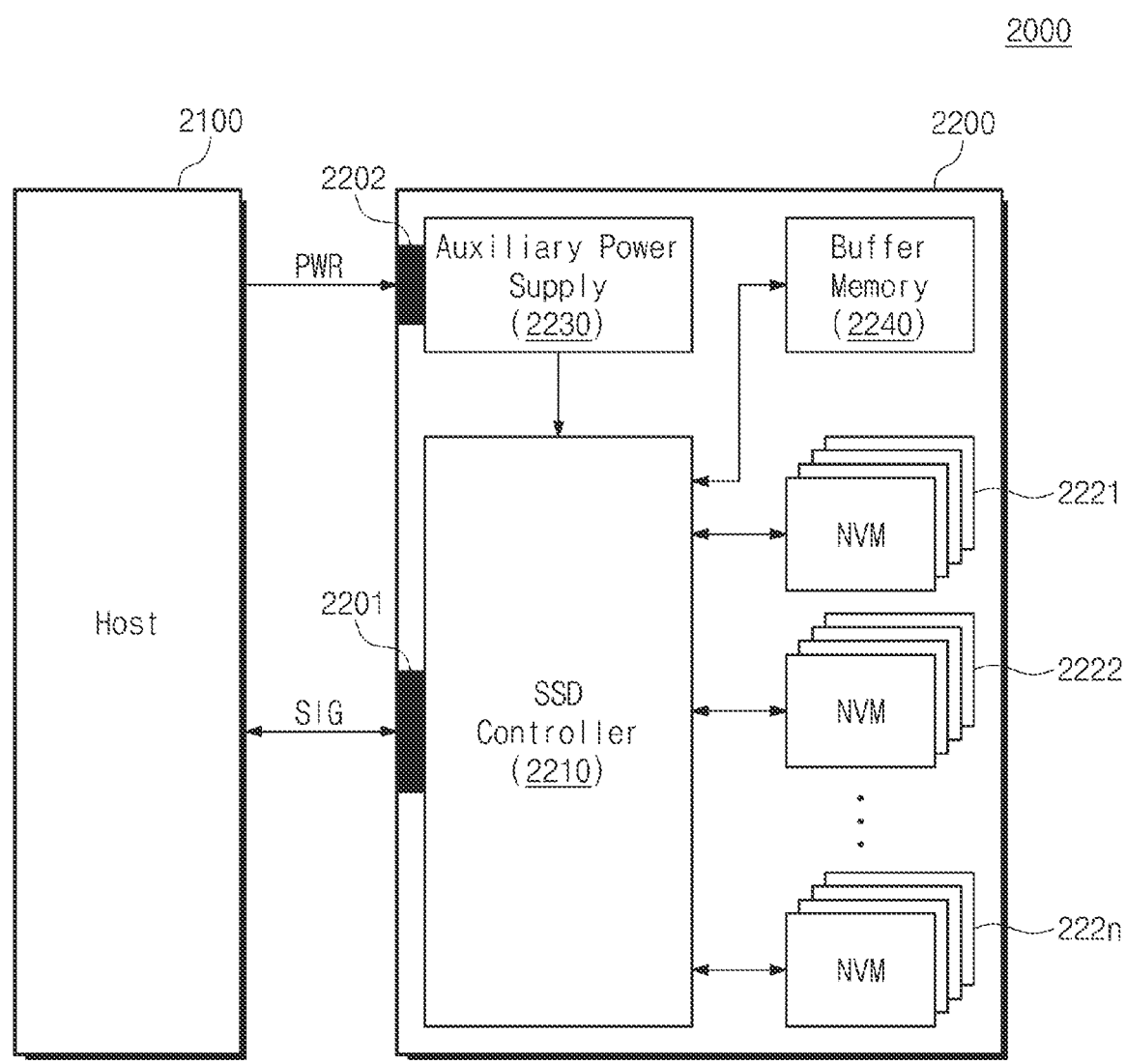
FIG. 19 is a block diagram illustrating a solid state drive (SSD) system applicable to a memory expander according to the present disclosure.

FIG. 19 is a block diagram illustrating a solid state drive (SSD) system applicable to a memory expander according to the present disclosure. Referring to FIG. 19, an SSD system 2000 may include a host 2100 and a storage device 2200. The storage device 2200 may exchange signals SIG with the host 2100 through a signal connector 2201 and may be supplied with power PWR through a power connector 2202. The storage device 2200 includes an SSD controller 2210, a plurality of nonvolatile memories 2221 to 222n, an auxiliary power supply 2230, and a buffer memory 2240.

The SSD controller 2210 may control the plurality of nonvolatile memories 2221 to 222n in response to the signals SIG received from the host 2100. The plurality of nonvolatile memories 2221 to 222n may operate under control of the SSD controller 2210. The auxiliary power supply 2230 is connected with the host 2100 through the power connector 2202. The auxiliary power supply 2230 may be charged by the power PWR supplied from the host 2100. When the power PWR is not smoothly supplied from the host 2100, the auxiliary power supply 2230 may power the storage device 2200. The buffer memory 2240 may be used as a buffer memory of the storage device 2200.

In an embodiment, the host 2100 may include a CPU and a plurality of accelerators as described with reference to FIGS. 1 to 18B. In an embodiment, the storage device 2200 may be a memory expander described with reference to FIGS. 1 to 18B. The host 2100 and the storage device 2200 may communicate with each other through the CXL interfaces and may operate depending on the embodiments described with reference to FIGS. 1 to 18B.

Figure 20:
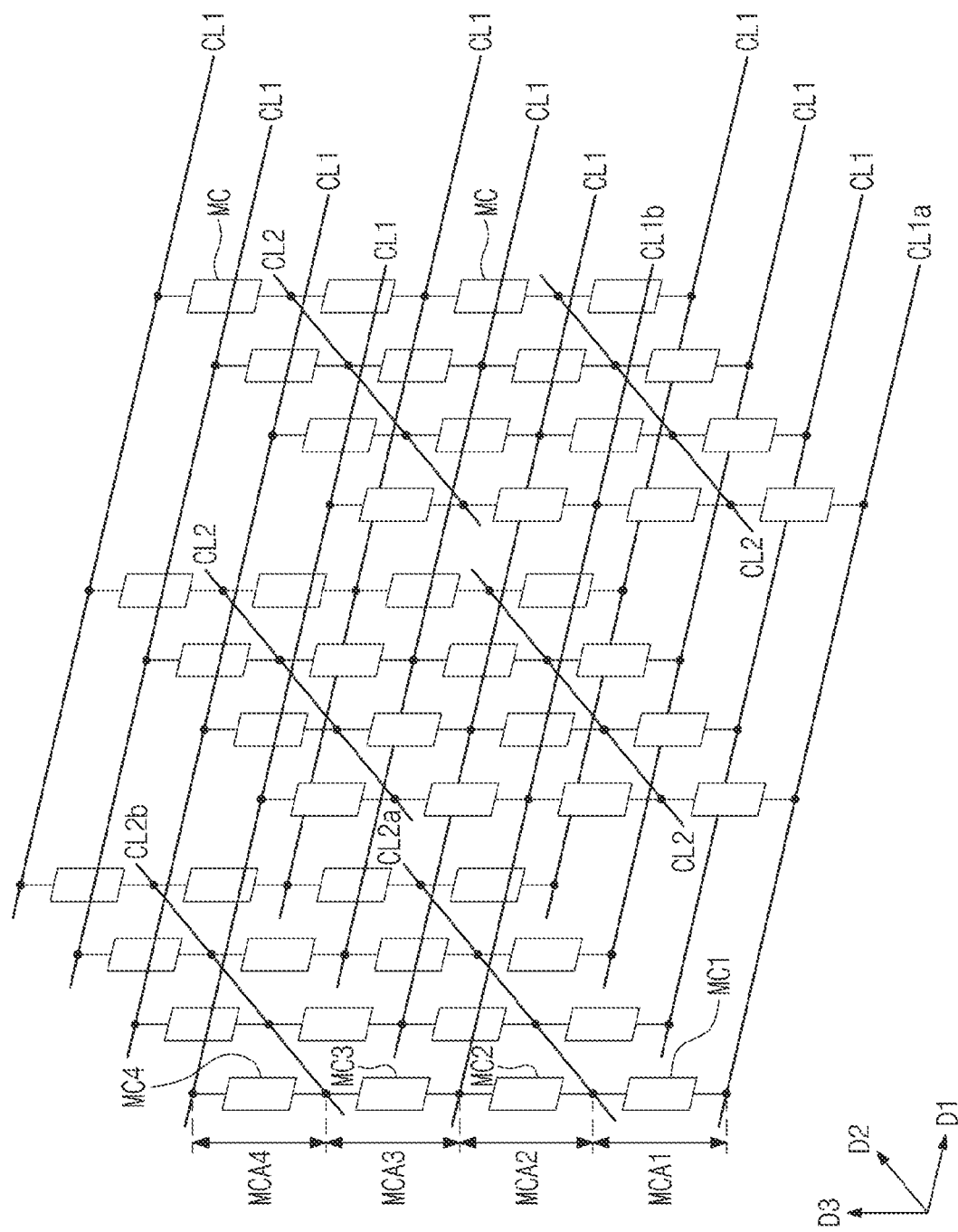
FIG. 20 is a circuit diagram illustrating a three-dimensional structure of a memory device included in a memory expander according to an embodiment of the present disclosure.

FIG. 20 is a circuit diagram illustrating a three-dimensional structure of a memory device included in a memory expander according to an embodiment of the present disclosure. In an embodiment, a memory device may be implemented based on various memories. A configuration of a memory device based on a specific memory structure will be described with reference to FIG. 20, but the present disclosure is not limited thereto. For example, a memory device may be implemented based on at least one of various memories.

Referring to FIG. 20, a memory device may be implemented in a three-dimensional stacked structure. For example, the memory device includes first to fourth memory cell array layers MCA1 to MCA4. The first to fourth memory cell array layers MCA1 to MCA4 may include a plurality of memory cells MC1, MC2, MC3, and MC4.

The first to fourth memory cell array layers MCA1 to MCA4 may be stacked in a third direction D3, and conductive lines CL1 and CL2 extending in a first direction D1 and a second direction D2 may be alternately formed between the first to fourth memory cell array layers MCA1 to MCA4. For example, the first conductive lines CL1 may extend in the first direction D1, and the second conductive lines CL2 may extend in the second direction D2. The first memory cell array layer MCA1 may be formed above the first conductive lines CL1, and the second conductive lines CL2 may be formed between the first and second memory cell array layers MCA1 and MCA2. The first conductive lines CL1 may be formed between the second and third memory cell array layers MCA2 and MCA3, and the second conductive lines CL2 may be formed between the third and fourth memory cell array layers MCA3 and MCA4. The first conductive lines CL1 may be formed above the fourth memory cell array layer MCA4. The first and second conductive lines CL1 and CL2 may be electrically connected with memory cells adjacent in the third direction D3.

In an embodiment, a target bit line and a target word line may be determined depending on a location of a target memory cell MC. For example, in the case where a first memory cell MC1 of the first memory cell array layer MCA1 is a target memory cell MC, conductive lines CL1$a$ and CL2$a$ may be selected as target lines. In the case where a second memory cell MC2 of the second memory cell array layer MCA2 is a target memory cell MC, conductive lines CL2$a$ and CL1$b$ may be selected as target lines. In the case where a third memory cell MC3 of the third memory cell array layer MCA3 is a target memory cell MC, conductive lines CL1$b$ and CL2$b$ may be selected as target lines. That is, target lines may be selected depending on a location of a target memory cell MC, and the selected target lines may be used as a bit line and a word line or as a word line and a bit line depending on a location of the target memory cell. However, the present disclosure is not limited thereto.

Figure 21:
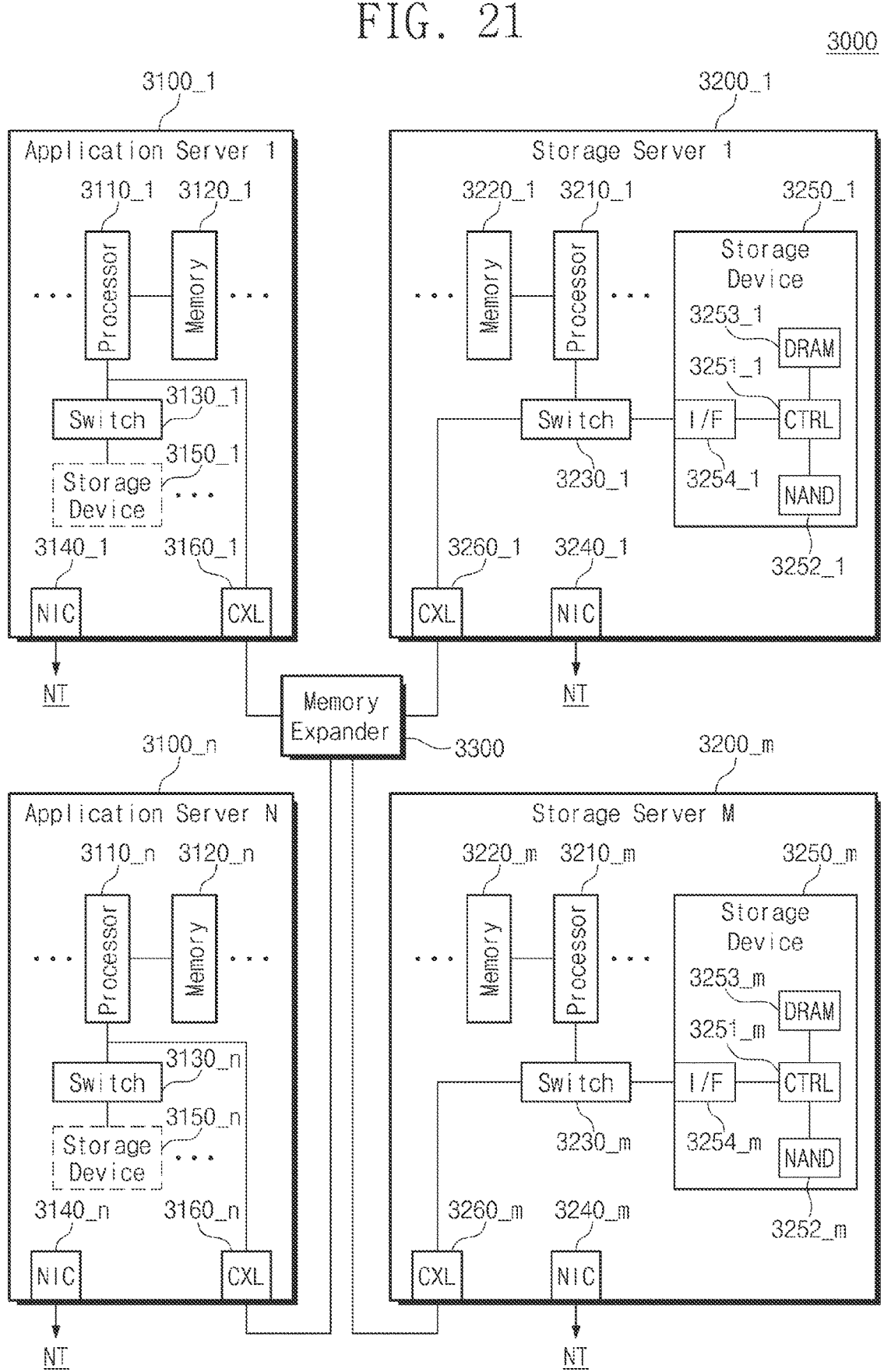
FIG. 21 is a block diagram illustrating a data center to which a server system according to an embodiment of the present disclosure is applied.

FIG. 21 is a block diagram illustrating a data center to which a server system according to an embodiment of the present disclosure is applied. Referring to FIG. 21, a data center 3000 that is a facility maintaining a variety of data and providing various services associated with data may be called a "data storage center". The data center 3000 may be a system for a search engine or database management or may be a computing system used in various institutions. The data center 3000 may include a plurality of application servers 3100_1 to 3100_$n$ and a plurality of storage servers 3200_1 to 3200_$m$. The number of application servers 3100_1 to 3100_$n$ and the number of storage servers 3200_1 to 3200_$m$ may be variously changed or modified.

Below, for convenience of description, an example of the first storage server 3200_1 will be described. Each of the remaining storage servers 3200_2 to 3200_$m$ and the plurality of application servers 3100_1 to 3100_$n$ may have a structure similar to that of the first storage server 3200_1.

The first storage server 3200_1 may include a processor 3210_1, a memory 3220_1, a switch 3230_1, a network interface connector (NIC) 3240_1, a storage device 3250_1, and a compute express link (CXL) interface controller 3260_1. The processor 3210_1 may perform overall operations of the first storage server 3200_1. The memory 3220_1 may store various instructions or data under control of the processor 3210_1. The processor 3210_1 may be configured to access the memory 3220_1 to execute various instructions or to process data. In an embodiment, the memory 3220_1 may include at least one of various kinds of memory devices such as a DDR SDRAM (Double Data Rate Synchronous DRAM), a HBM (High Bandwidth Memory), a HMC (Hybrid Memory Cube), a DIMM (Dual In-line Memory Module), an Optane DIMM, and an NVDIMM (Non-Volatile DIMM)

In an embodiment, the number of processors 3210_1 included in the first storage server 3200_1 and the number of memories 3220_1 included in the first storage server 3200_1 may be variously changed or modified. In an embodiment, the processor 3210_1 and the memory 3220_1 included in the first storage server 3200_1 may constitute a processor-memory pair, and the number of processor-memory pairs included in the first storage server 3200_1 may be variously changed or modified. In an embodiment, the number of processors 3210_1 included in the first storage server 3200_1 and the number of memories 3220_1 included in the first storage server 3200_1 may be different. The processor 3210_1 may include a single core processor or a multi-core processor.

Under control of the processor 3210_1, the switch 3230_1 may selectively connect the processor 3210_1 and the storage device 3250_1 or may selectively connect the NIC 3240_1, the storage device 3250_1, and the CXL interface controller 3260_1.

The NIC 3240_1 may connect the first storage server 3200_1 with the network NT. The NIC 3240_1 may include a network interface card, a network adapter, and the like. The NIC 3240_1 may be connected with the network NT through a wired interface, a wireless interface, a Bluetooth interface, or an optical interface. The NIC 3240_1 may include an internal memory, a DSP, a host bus interface, and the like and may be connected with the processor 3210_1 or the switch 3230_1 through the host bus interface. The host bus interface may include at least one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, a USB (Universal Serial Bus) interface, an SD (Secure Digital) card interface, an MMC (Multi-Media Card) interface, an eMMC (embedded Multi-Media Card) interface, a UFS (Universal Flash Storage) interface, an eUFS (embedded Universal Flash Storage) interface, and a CF (Compact Flash) card interface. In an embodiment, the NIC 3240_1 may be integrated with at least one of the processor 3210_1, the switch 3230_1, and the storage device 3250_1.

Under control of the processor 3210_1, the storage device 3250_1 may store data or may output the stored data. The storage device 3250_1 may include a controller 3251_1, a nonvolatile memory 3252_1, a DRAM 3253_1, and an interface 3254_1. In an embodiment, the storage device 3250_1 may further include a secure element (SE) for security or privacy.

The controller 3251_1 may control overall operations of the storage device 3250_1. In an embodiment, the controller 3251_1 may include an SRAM. In response to signals received through the interface 3254_1, the controller 3251_1 may store data in the nonvolatile memory 3252_1 or may output data stored in the nonvolatile memory 3252_1. In an embodiment, the controller 3251_1 may be configured to control the nonvolatile memory 3252_1 based on a toggle interface or an ONFI.

The DRAM 3253_1 may be configured to temporarily store data to be stored in the nonvolatile memory 3252_1 or data read from the nonvolatile memory 3252_1. The DRAM 3253_1 may be configured to store various data (e.g., metadata and mapping data) necessary for the controller 3251_1 to operate. The interface 3254_1 may provide a physical connection between the controller 3251_1 and the processor 3210_1, the switch 3230_1, or the NIC 3240_1. In an embodiment, the interface may be implemented to support a DAS (Direct-Attached Storage) manner that allows the direct connection of the storage device 3250_1 through a dedicated cable. In an embodiment, the interface 3254_1 may be implemented based on at least one of various above-described interfaces through a host interface bus.

The above components of the first storage server 3200_1 are provided as an example, and the present disclosure is not limited thereto. The above components of the first storage server 3200_1 may be applied to each of the remaining storage servers 3200_2 to 3200_m or each of the plurality of application servers 3100_1 to 3100_n. In an embodiment, each of storage devices 3150_1 to 3150_n of the application servers 3100_1 to 3100_n may be selectively omitted.

The plurality of application servers 3100_1 to 3100_n and the plurality of storage servers 3200_1 to 3200_m may communicate with each other over the network NT. The network NT may be implemented by using a Fibre channel (FC), an Ethernet, or the like. In this case, the FC may be a medium that is used in high-speed data transmission and may use an optical switch providing high performance/high availability. Depending on an access manner of the network NT, the storage servers 3200_1 to 3200_m may be provided as file storage, block storage, or object storage.

In an embodiment, the network NT may be a storage dedicated network such as a storage area network (SAN). For example, the SAN may be an FC-SAN that uses an FC network and is implemented in compliance with an FC protocol (FCP). Alternatively, the SAN may be an IP-SAN that uses a TCP/IP network and is implemented in compliance with an iSCSI (or SCSI over TCP/IP or an Internet SCSI) protocol. In an embodiment, the network NT may be a general network such as a TCP/IP network. For example, the network NT may be implemented in compliance with a protocol such as FCoE (FC over Ethernet), NAS (Network Attached Storage), or NVMe-oF (NVMe over Fabrics).

In an embodiment, at least one of the plurality of application servers 3100_1 to 3100_n may be configured to access at least one of the remaining application servers or at least one of the plurality of storage servers 3200_1 to 3200_m over the network NT.

For example, the first application server 3100_1 may store data requested by a user or a client in at least one of the plurality of storage servers 3200_1 to 3200_m over the network NT. Alternatively, the first application server 3100_1 may obtain data requested by the user or the client from at least one of the plurality of storage servers 3200_1 to 3200_m over the network NT. In this case, the first application server 3100_1 may be implemented with a web server, a database management system (DBMS), or the like.

That is, a processor 3110_1 of the first application server 3100_1 may access a memory (e.g., 3120_n) or a storage device (e.g., 3150_n) of another application server (e.g., 3100_n) over the network NT. Alternatively, the processor 3110_1 of the first application server 3100_1 may access the memory 3220_1 or the storage device 3250_1 of the first storage server 3200_1 over the network NT. As such, the first application server 3100_1 may perform various operations on data stored in the remaining application servers 3100_2 to 3100_n or the plurality of storage servers 3200_1 to 3200_m. For example, the first application server 3100_1 may execute or issue an instruction for moving or copying data between the remaining application servers 3100_2 to 3100_n or between the plurality of storage servers 3200_1 to 3200_m. In this case, data targeted for movement or copy may be moved from the storage devices 3250_1 to 2250_m of the storage servers 3200_1 to 3200_m to the memories 3120_1 to 3120_n of the application servers 3100_1 to 3100_n through the memories 3220_1 to 3220_m of the storage servers 3200_1 to 3200_m or directly. Data transferred over the network NT may be data that are encrypted for security or privacy.

In an embodiment, the plurality of storage servers 3200_1 to 3200_m and the plurality of application servers 3100_1 to 3100_n may be connected with a memory expander 3300 through the CXL interface. The memory expander 3300 may be used as an expanded memory of each of the plurality of storage servers 3200_1 to 3200_m and the plurality of application servers 3100_1 to 3100_n. The plurality of storage servers 3200_1 to 3200_m and the plurality of application servers 3100_1 to 3100_n may communicate with each other through the CXL interface and the memory expander 3300, based on the manner described with reference to FIGS. 1 to 18B.

Figure 22:
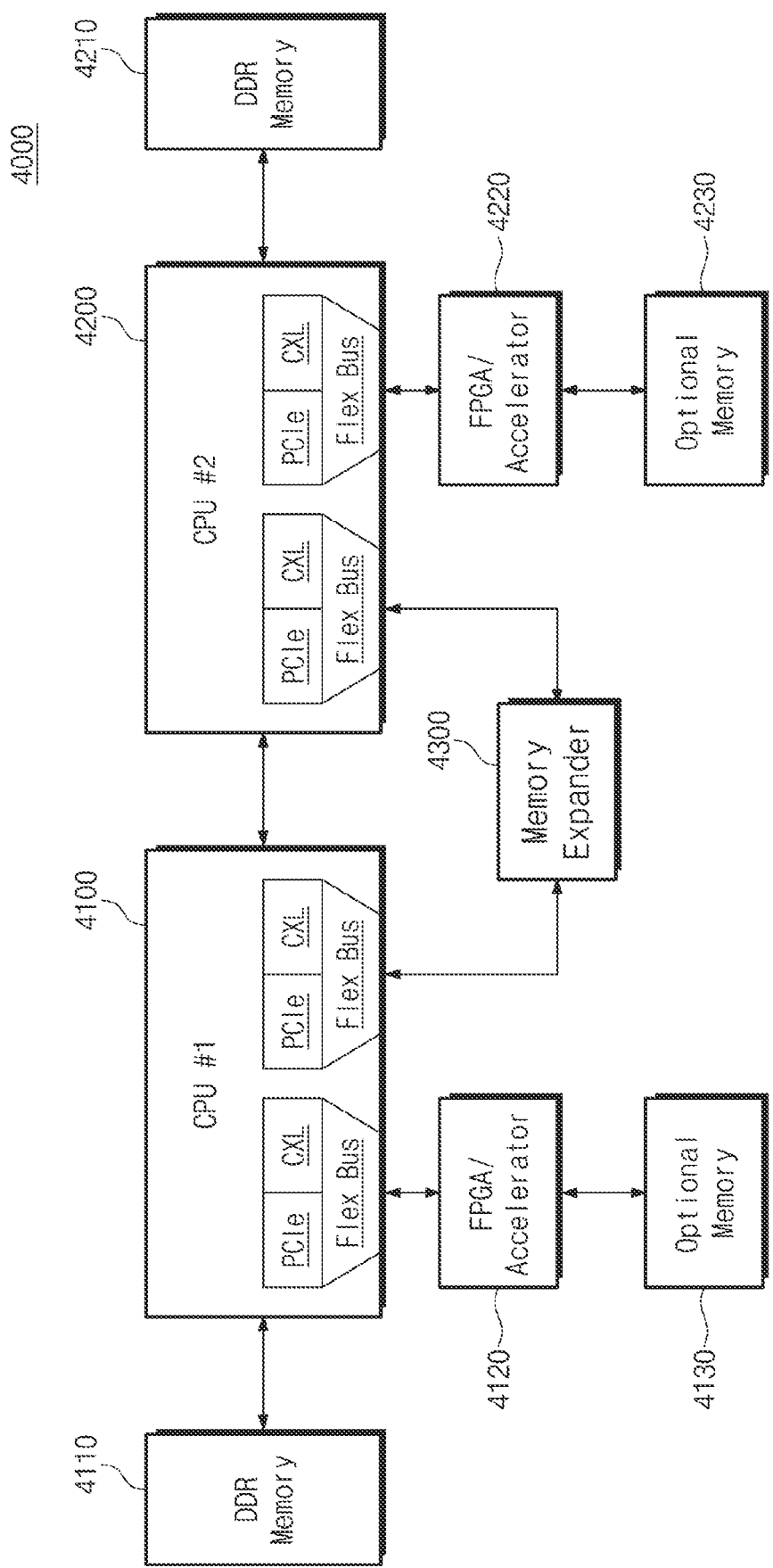
FIG. 22 is a diagram for describing an example (e.g., a CXL interface) of a heterogeneous computing interface applied to an embodiment of the present disclosure.

FIG. 22 is a diagram for describing an example (e.g., a CXL interface) of a heterogeneous computing interface applied to an embodiment of the present disclosure. In FIG. 22, a heterogeneous computing interface connected with a memory expander according to an embodiment of the present disclosure will be described with reference to the CXL interface, but the present disclosure is not limited thereto. For example, the heterogeneous computing interface may be implemented based on at least one of various computing interfaces such as a Gen-Z protocol, an NVLink protocol, a CCIX protocol, and an Open CAPI protocol.

Referring to FIG. 22, a heterogeneous computing system 4000 may include a plurality of CPUs 4100 and 4200, a plurality of memories 4110 and 4210, accelerators 4120 and 4220, optional memories 4130 and 4230, and a memory expander 4300. Each of the plurality of CPUs 4100 and 4200 may be a processor configured to process various operations/calculations/computations. The plurality of CPUs 4100 and 4200 may communicate with each other through a separate link. In an embodiment, the separate link may include a coherent link between CPUs.

The plurality of CPUs 4100 and 4200 may communicate with the plurality of memories 4110 and 4210, respectively. For example, the first CPU 4100 may directly communicate with the first memory 4110, and the second CPU 4200 may directly communicate with the second memory 4210. Each of the first and second memories 4110 and 4210 may include a DDR memory. In an embodiment, a virtual memory allocated to different virtual machines according to an embodiment of the present disclosure may be a memory allocated from the DDR memories 4110 and 4210.

The plurality of CPUs 4100 and 4200 may communicate with the accelerators 4120 and 4220 through a flex bus. The accelerators 4120 and 4220 may be calculators or processors that perform operations independently of the plurality of CPUs 4100 and 4200. The accelerator 4120 may operate under control of the corresponding CPU 4100, and the accelerator 4220 may operate under control of the corresponding CPU 4200. The accelerators 4120 and 4220 may be respectively connected with the optional memories 4130 and 4230. In an embodiment, the plurality of CPUs 4100 and 4200 may be configured to access the optional memories 4130 and 4230 through the flex bus and the accelerators 4120 and 4220.

The plurality of CPUs 4100 and 4200 may communicate with the memory expander 4300 through the flex bus. The plurality of CPUs 4100 and 4200 may use a memory space of the memory expander 4300.

In an embodiment, the flex bus may be a bus or a port configured to select a PCIe protocol or a CXL protocol. That is, the flex bus may be configured to select the PCIe protocol or the CXL protocol depending on a characteristic or a communication type of a device connected therewith. In an embodiment, the memory expander 4300 may operate like the memory expander described with reference to FIGS. 1 to 18B and may communicate with the plurality of CPUs 4100 and 4200 based on the CXL protocol.

In an embodiment, a flex bus-based communication structure is illustrated in FIG. 22 as being independent between components, but the present disclosure is not limited thereto.

For example, the CXL communication between various components illustrated in FIG. 22 may be perform through the same bus or the same link.

According to the present disclosure, a memory expander that is connected with a CPU and a plurality of accelerators through heterogeneous computing interfaces may be configured to manage data to be provided to the plurality of accelerators or data received from the plurality of accelerators. As such, the burden of the CPU associated with data management may be reduced. Accordingly, a memory expander with improved performance, a heterogeneous computing device using the memory expander, and an operation method of the heterogeneous computing device are provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory expander comprising:
a memory device configured to store a plurality of task data; and
a controller configured to control the memory device, wherein the controller is configured to:
receive metadata and a management request from an external central processing unit (CPU) through a compute express link (CXL) interface;
operate in a management mode in response to the management request; and
in the management mode, receive a read request and a first address from an accelerator through the CXL interface and transmit one of the plurality of task data to the accelerator based on the metadata in response to the read request.

2. The memory expander of claim 1, wherein the management request is an M2S RwD (Master to Subordinate Request with Data) message based on a CXL protocol.

3. The memory expander of claim 2, wherein:
the management request includes a first CXL header, and
the first CXL header includes:
a memory operation code field indicating a start of the management mode;
a first address field indicating a start memory address of the plurality of task data;
a second address field indicating an end memory address of the plurality of task data;
a tag field indicating a task number associated with the plurality of task data; and
a position field indicating a memory address of the metadata.

4. The memory expander of claim 1, wherein in the management mode, the controller is further configured to:
receive a write request and first result data from the accelerator; and
store the first result data in the memory device based on the metadata, in response to the write request.

5. The memory expander of claim 1, wherein the metadata includes at least one of:
a task number associated with a task corresponding to the plurality of task data;
a data management mode indicating a management manner associated with the plurality of task data;
a start memory address of the plurality of task data;
an end memory address of the plurality of task data;
a unit size associated with the plurality of task data;
a delimiter used to distinguish the plurality of task data;
an accelerator identifier corresponding to the task number;
a start memory address of a plurality of result data associated with the plurality of task data; and
an end memory address of the plurality of result data.

6. The memory expander of claim 1, wherein in the management mode, the controller is further configured to transmit a completion to the central processing unit through the CXL interface when a plurality of result data respectively associated with the plurality of task data are stored in the memory device.

7. The memory expander of claim 6, wherein the completion is an S2M DRS (Subordinate to Master Data Response) message based on a CXL protocol.

8. The memory expander of claim 7, wherein:
the completion includes a second CXL header, and
the second CXL header includes:
a memory operation code field indicating a kind of a computation result of the plurality of task data;
a tag field indicating a task number associated with the plurality of task data;
a position field indicating a memory address of the plurality of result data; and
a reserved field including statistical information about the plurality of task data.

9. The memory expander of claim 1, wherein in the management mode, the controller is further configured to:
receive a status request from the central processing unit through the CXL interface; and
transmit information about a read counter associated with the plurality of task data and information about a write counter associated with a plurality of result data to the central processing unit in response to the status request.

10. The memory expander of claim 9, wherein the status request is an M2S Req (Master to Subordinate Request) message based on a CXL protocol.

11. The memory expander of claim 10, wherein:
the status request includes a third CXL header, and
the third CXL header includes:
- a memory operation code field indicating a manner of inquiring about a processing state associated with the plurality of task data;
- a tag field indicating a task number associated with the plurality of task data;
- an address field indicating a range of task data to be inquired from among the plurality of task data; and
- a reserved field indicating an inquiry unit or an inquiry time of the processing state.

12. A heterogeneous computing device comprising:
a central processing unit (CPU);
a memory configured to store data under control of the CPU;
an accelerator configured to repeatedly perform computation on a plurality of task data and to generate a plurality of result data; and
a memory expander configured to operate in a management mode in response to a management request from the CPU and to manage the plurality of task data to be provided to the accelerator and the plurality of result data provided from the accelerator, in the management mode, wherein
the CPU, the accelerator, and the memory expander communicate with each other through a heterogeneous computing interface.

13. The heterogeneous computing device of claim 12, wherein the heterogeneous computing interface is an interface based on a compute express link (CXL) protocol, a Gen-Z protocol, an NVlink protocol, a cache coherent interconnect for accelerators (CCIX) protocol, an open coherent accelerator processor interface (CAPI) protocol.

14. The heterogeneous computing device of claim 12, wherein the memory expander is further configured to:
receive metadata from the CPU; and
manage the plurality of task data and the plurality of result data based on the metadata.

15. The heterogeneous computing device of claim 12, wherein while the accelerator respectively performs the computation on the plurality of task data, the accelerator does not generate an interrupt to the CPU.

16. The heterogeneous computing device of claim 15, wherein when the memory expander receives all the plurality of result data from the accelerator, the memory expander is configured to transmit a completion to the CPU through the heterogeneous computing interface.

17. An operation method of a heterogeneous computing device which includes a central processing unit (CPU), an accelerator, and a memory expander connected through a compute express link (CXL) interface, the method comprising:
transmitting, by the CPU, metadata to the memory expander;
transmitting, by the CPU, a management request to the memory expander;
transmitting, by the CPU, a task request to the accelerator;
transmitting, by the accelerator, a read request to the memory expander in response to the task request;
transmitting, by the memory expander, first task data of a plurality of task data to the accelerator based on the metadata, in response to the read request;
performing, by the accelerator, first computation on the first task data to generate first result data;
transmitting, by the accelerator, a write request and the first result data to the memory expander; and
storing, by the memory expander, the first result data in response to the write request.

18. The method of claim 17, wherein the accelerator does not generate an interrupt to the CPU after performing the first computation.

19. The method of claim 17, further comprising after the first result data are stored in the memory expander:
transmitting, by the accelerator, the read request to the memory expander; and
transmitting, by the memory expander, second task data of a plurality of task data to the accelerator based on the metadata, in response to the read request.

20. The method of claim 19, further comprising:
performing, by the accelerator, second computation on the second task data to generate second result data;
transmitting, by the accelerator, the write request and the second result data to the memory expander; and
storing, by the memory expander, the second result data based on the metadata, in response to the write request, wherein
the first result data and the second result data are stored in different memory regions.

* * * * *